(12) United States Patent
Abe

(10) Patent No.: US 8,704,936 B2
(45) Date of Patent: Apr. 22, 2014

(54) IMAGE FORMING OPTICAL SYSTEM, IMAGE PICKUP APPARATUS USING THE SAME, AND INFORMATION PROCESSING APPARATUS

(71) Applicant: Olympus Corporation, Tokyo (JP)

(72) Inventor: Kenichiro Abe, Tokyo (JP)

(73) Assignee: Olympus Corporation, Tokyo (JP)

( * ) Notice: Subject to any disclaimer, the term of this patent is extended or adjusted under 35 U.S.C. 154(b) by 40 days.

(21) Appl. No.: 13/647,022

(22) Filed: Oct. 8, 2012

(65) Prior Publication Data

US 2013/0100323 A1    Apr. 25, 2013

(30) Foreign Application Priority Data

Oct. 19, 2011   (JP) .................................. 2011-230052

(51) Int. Cl.
*H04N 5/225* (2006.01)
*G02B 9/34* (2006.01)

(52) U.S. Cl.
USPC ............ 348/340; 359/715; 359/740; 359/773

(58) Field of Classification Search
USPC ............................ 348/340; 359/715, 771–773
See application file for complete search history.

(56) References Cited

U.S. PATENT DOCUMENTS

| | | | |
|---|---|---|---|
| 7,777,972 B1 * | 8/2010 | Chen et al. ...................... | 359/773 |
| 8,218,253 B2 * | 7/2012 | Tang .............................. | 359/773 |
| 8,400,553 B2 * | 3/2013 | Yamashita et al. ............ | 348/340 |
| 8,405,919 B2 * | 3/2013 | Tsai et al. ...................... | 359/715 |
| 8,605,195 B2 * | 12/2013 | Tanaka et al. ................. | 348/340 |
| 2011/0254992 A1 * | 10/2011 | Abe ............................... | 348/340 |
| 2012/0069239 A1 * | 3/2012 | Ohki ............................. | 348/345 |
| 2012/0081595 A1 * | 4/2012 | Uchida ......................... | 348/340 |

FOREIGN PATENT DOCUMENTS

JP   2010-060835 A   3/2010

* cited by examiner

*Primary Examiner* — Ngoc-Yen Vu
(74) *Attorney, Agent, or Firm* — Brosemer, Kolefas & Assoc., LLC

(57) ABSTRACT

An image forming optical system of four lenses includes in order from an object side, a first lens having a positive refractive power, which is a biconvex lens, a second lens having a negative refractive power, of which, an image-side surface is a concave surface, a third lens having a positive refractive power, which is meniscus-shaped with a concave surface directed toward the object side, a fourth lens having a negative refractive power, of which, an image-side surface is a concave surface, and an aperture stop which is disposed nearest to the object side. The image forming optical system satisfies predetermined conditional expressions.

12 Claims, 21 Drawing Sheets

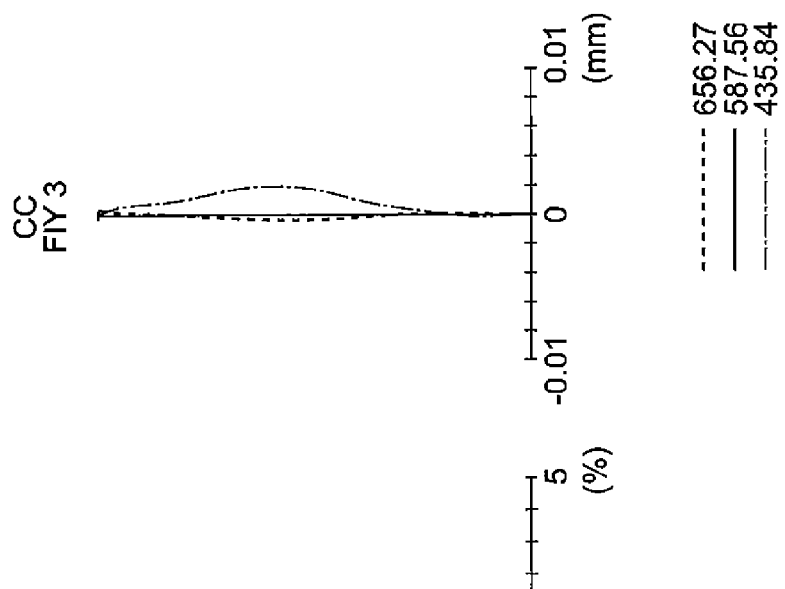
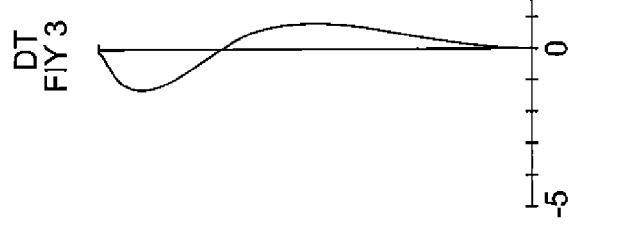
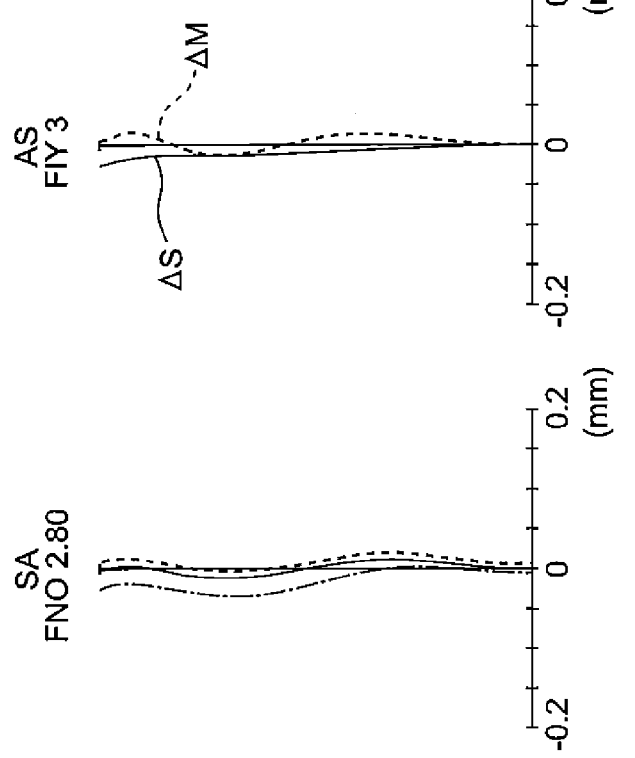

IMAGE FORMING OPTICAL SYSTEM, IMAGE PICKUP APPARATUS USING THE SAME, AND INFORMATION PROCESSING APPARATUS

CROSS-REFERENCE TO RELATED APPLICATION

The present application is based upon and claims the benefit of priority from the prior Japanese Patent Application No. 2011-230052 filed on Oct. 19, 2011; the entire contents of which are incorporated herein by reference.

BACKGROUND OF THE INVENTION

1. Field of the Invention

The present invention relates to an image forming optical system, and image pickup apparatus using the same, and information processing apparatus.

2. Description of the Related Art

In recent years, with the thinning of equipment's such a mobile telephone, a portable terminal, and a notebook-size personal computer, a camera module in which, a length of an optical system in an optical axial direction is thinned to the minimum has been sought. Moreover, with the technological development of an image pickup element and the increasing needs of the market, it has been sought that an image pickup element with a large number of pixels is used, and that an image pickup lens has a high resolution.

In order to fulfill the requirement, a large number of optical systems with a single focal length, which include four aspheric lenses, have been proposed.

As an optical system in which, the number of lenses is let to be four, and shortening of an overall length of the optical system and widening of an angle of field have been facilitated while improving an imaging performance, U.S. Pat. No. 7,777,972 Specification, and Japanese Patent Application Laid-open Publication No. 2010-060835 have been proposed. Optical system in the abovementioned patent literatures includes four aspheric lenses, and has an improved performance.

SUMMARY OF THE INVENTION

An image forming optical system according to the present invention has four lenses including, a first lens having a positive refractive power, which is a biconvex lens, a second lens having a negative refractive power, of which, an image-side surface is a concave surface, a third lens having a positive refractive power, which is meniscus-shaped with a concave surface directed toward the object side, a fourth lens having a negative refractive power, of which, an image-side surface is a concave surface, and an aperture stop which is disposed nearest to the object side, and the image forming optical system satisfies the following conditional expressions (1) and (2)

$$\theta 9 < 48 \quad (1)$$

$$TL/2Y < 0.8 \quad (2)$$

where, $\theta 9$ denotes the maximum value (unit: degree) of an angle between a plane-normal over an entire effective plane of the image-side surface of the fourth lens, TL denotes a distance from a surface vertex of a surface of the first lens up to an image plane, and Y denotes the maximum image height.

An image pickup apparatus according to the present invention includes one of the abovementioned image forming optical systems and an auto-focusing mechanism that are integrated.

An image pickup apparatus according to the present invention includes one of the abovementioned image forming optical systems and an image pickup element that are integrated.

An information processing apparatus according to the present invention includes an input section used to operate the information processing apparatus, a processing section that processes at least information from the input section, an image pickup apparatus that obtains image information based on information from the processing section, an image processing section that processes the image information obtained by the image pickup apparatus, and a display section that displays the processed image, and the image pickup apparatus is one of the abovementioned image pickup apparatuses.

BRIEF DESCRIPTION OF THE DRAWINGS

FIG. 4A, FIG. 4B, FIG. 4C, and FIG. 4D are diagrams showing spherical aberration (SA), astigmatism (AS), distortion (DT), and chromatic aberration of magnification (CC) respectively, at the time of infinite object point focusing in the second embodiment;

FIG. 17A is a front view of a mobile telephone 400, FIG. 17B is a side view of the mobile telephone 400, and FIG. 17C is a cross-sectional view of a photographic optical system 405;

DETAILED DESCRIPTION OF THE INVENTION

Figure 1:
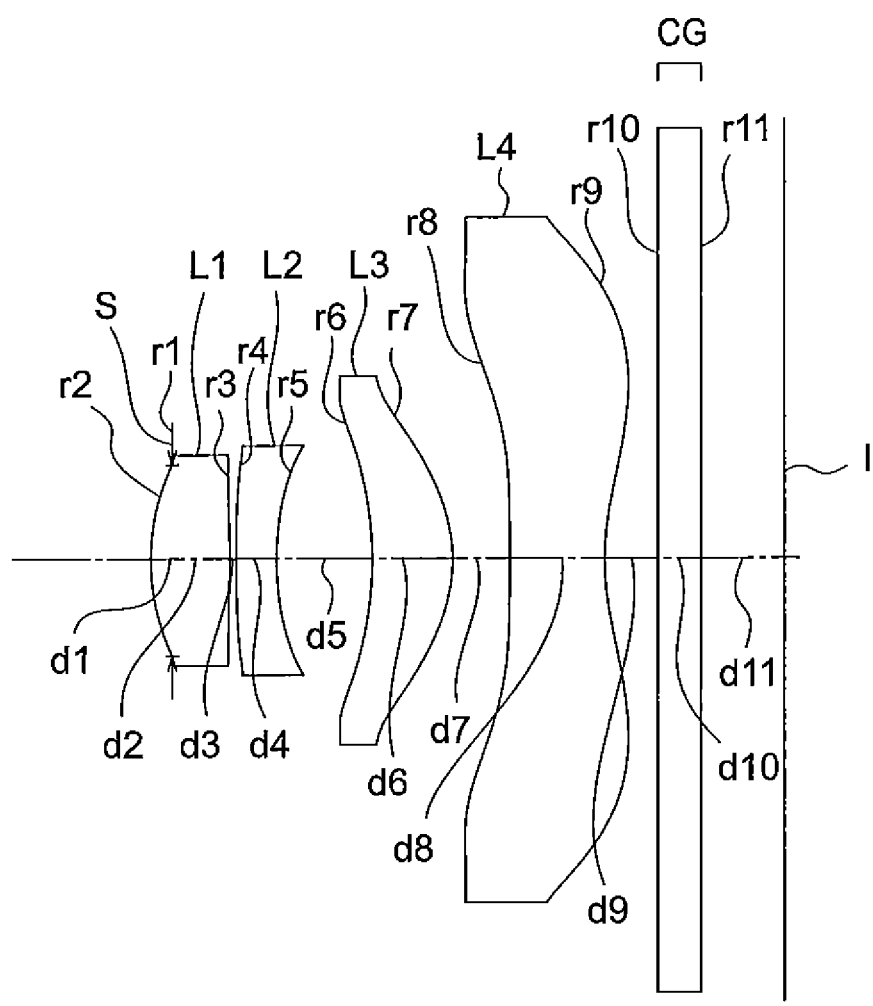
FIG. 1 is a cross-sectional view along an optical axis showing an optical arrangement at the time of infinite object point focusing of an image pickup optical system according to a first embodiment of the present invention.
Figure 2:
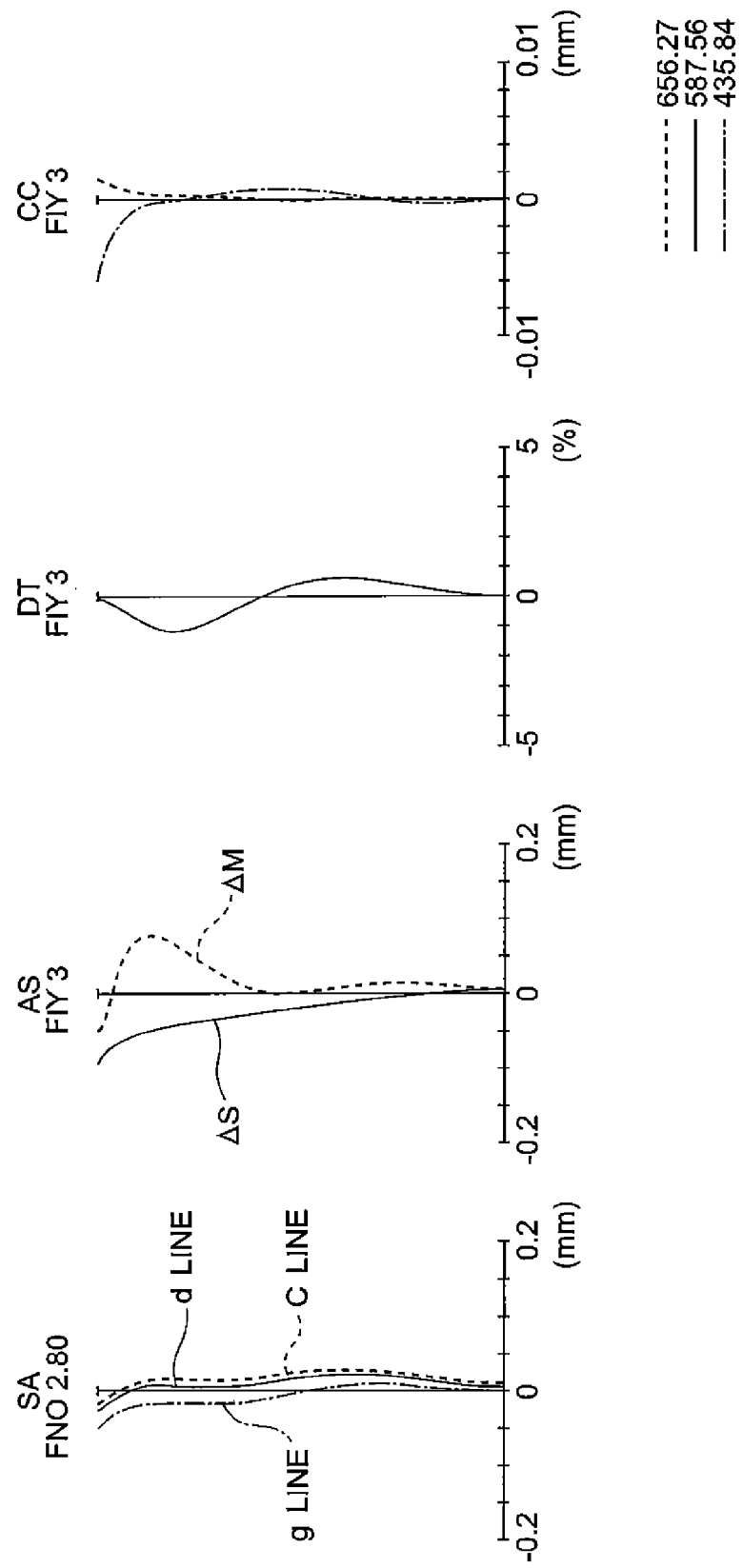
FIG. 2A, FIG. 2B, FIG. 2C, and FIG. 2D are diagrams showing spherical aberration (SA), astigmatism (AS), distortion (DT), and chromatic aberration of magnification (CC) respectively, at the time of infinite object point focusing in the first embodiment.

Prior to the description of embodiments, an action and an effect of an image forming optical system according to a mode will be described below.

An image forming optical system according to the mode has four lenses, and includes in order from an object side a first lens having a positive refractive power, which is a biconvex lens, a second lens having a negative refractive power, of which, an image-side surface is a concave surface, a third lens having a positive refractive power, which is meniscus-shaped with a concave surface directed toward the object side, a fourth lens having a negative refractive power, of which, an image-side surface is a concave surface, and an aperture stop which is disposed nearest to the object side, and the image forming optical system satisfies the following conditional expressions (1) and (2)

$$\theta 9 < 48 \quad (1)$$

$$TL/2Y < 0.8 \quad (2)$$

where,

θ9 denotes the maximum value (unit: degree) of an angle between a plane-normal over an entire area in an effective plane of the image-side surface of the fourth lens, TL denotes a distance from a surface vertex of a surface of the first lens up to an image plane, and Y denotes the maximum image height.

The entire area in an effective plane of the image side surface of the fourth lens means an area in the lens 4 through which a light beam passes.

Figure 18:
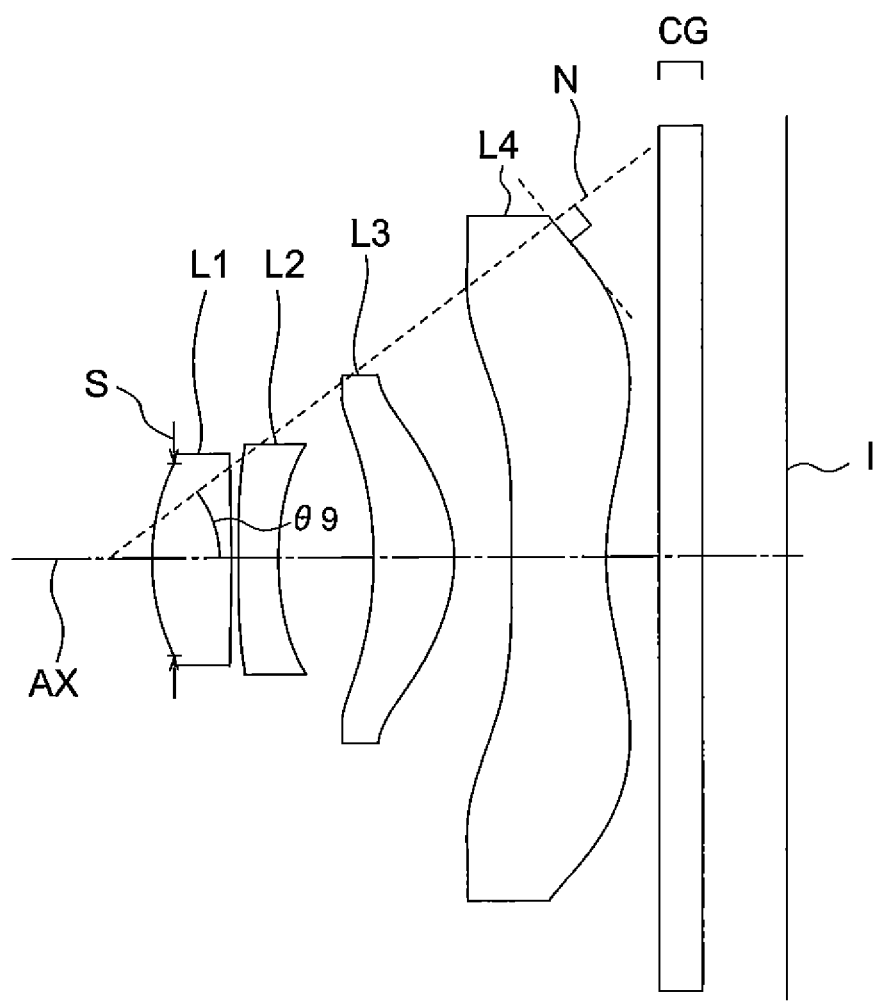
FIG. 18 is a cross-sectional view along an optical axis showing an optical arrangement at the time of infinite object point focusing of the image pickup optical system according to a mode of the present invention, and is a diagram showing θ9.

Moreover, FIG. 18 is a cross-sectional view along an optical axis showing an optical arrangement at the time of infinite object point focusing of the image pickup optical system according to the mode of the present invention, and is a diagram showing θ9.

By positioning a principal point on the object side of the optical system, it is possible to reduce sufficiently an overall length with respect to a focal length, and to realize shortening of the overall length.

By disposing the aperture stop nearest to the object side, it is possible to separate an exit pupil from an image plane, and to make small an angle of a light beam which is incident at a peripheral portion of an image pickup element. Therefore, it is possible to avoid reduction in (weakening of) oblique incident light at the peripheral portion of the image pickup element.

Conditional expressions (1) and (2) are conditions which are preferable for avoiding a ghost image.

When an upper limit value of conditional expressions (1) and (2) is surpassed, since an angle of reflection at the image-side surface of the fourth lens becomes large, there is a total reflection at an object-side surface of the fourth lens, and a strong ghost image is developed.

In the image forming optical system according to the mode, it is preferable that the aperture stop is disposed on the image side of a surface vertex of the first lens.

By disposing the aperture stop on the image side of the surface vertex of the first lens, since it is possible to make small an angle of incidence of an upper-side light beam of an off-axis light ray with respect to the object-side surface of the first lens, it is possible to suppress a coma aberration.

In the image forming optical system according to the mode, it is preferable that the fourth lens satisfies the following conditional expression (3).

$$0 < (r8+r9)/(r8-r9) < 1.7 \quad (3)$$

where, r8 denotes a paraxial radius of curvature on the object side of the fourth lens, and r9 denotes a paraxial radius of curvature on an image side of the fourth lens.

Conditional expression (3) is a condition which is preferable for suppressing an angle of emergence of light rays from the image-side surface of the fourth lens and for avoiding reduction in a quantity of light of marginal light rays, as well as for widening an angle of field.

When a lower limit value of conditional expression (3) is not reached, by the paraxial radius of curvature of the image side of the fourth lens becoming excessively small, an angle of emergence of off-axis light beam from the image-side surface of the fourth lens becomes large. As a result, an angle of a light ray which is incident at the peripheral portion of the image pickup element becomes large, and it becomes difficult to avoid reduction in a quantity of light of marginal light rays.

When an upper limit value of conditional expression (3) is surpassed, by a negative paraxial radius of curvature of the object side of the fourth lens becoming excessively small, a position of a principal point of the fourth lens is shifted toward the object side, and widening of the angle of field and shortening of a combined focal length of the overall optical system become difficult.

It is more preferable that the fourth lens satisfies the following conditional expression (3').

$$0.2<(r8+r9)/(r8-r9)<1.5 \qquad (3')$$

It is even more preferable that the fourth lens satisfies the following conditional expression (3").

$$0.5<(r8+r9)/(r8-r9)<1.3 \qquad (3")$$

Figure 19:
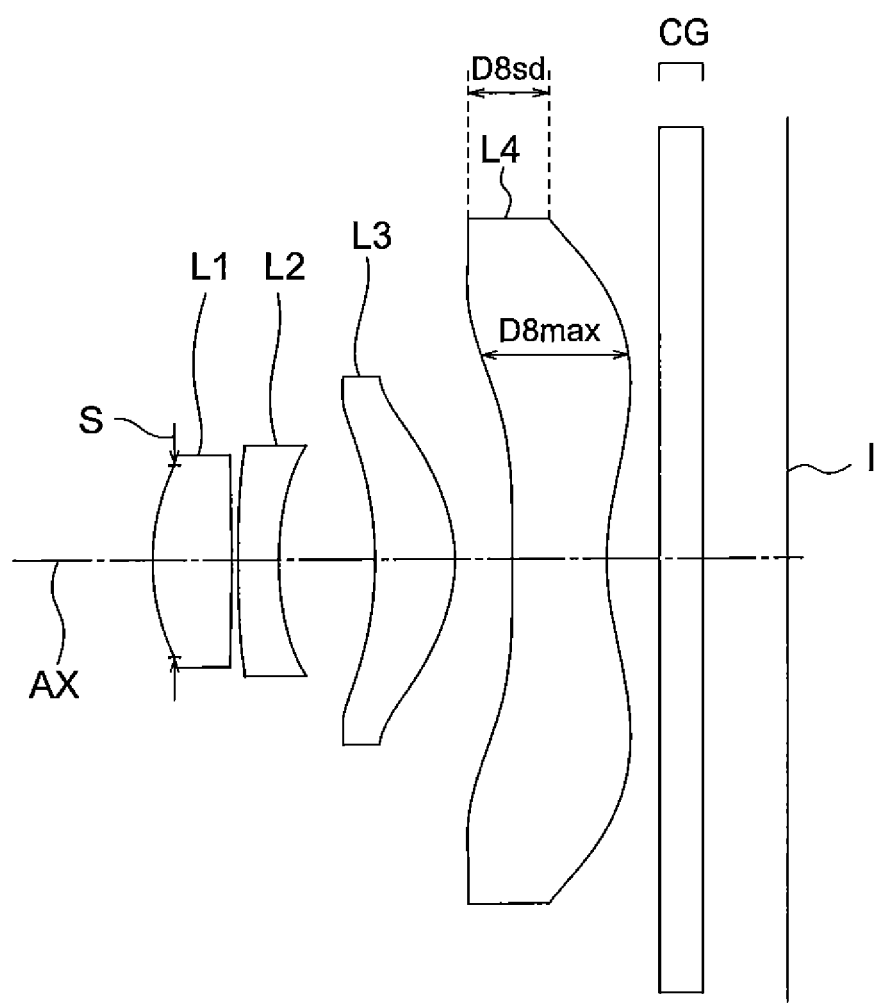
FIG. 19 is a cross-sectional view along an optical axis showing an optical arrangement at the time of infinite object point focusing of the image pickup optical system according to a mode of the present invention, and is a diagram showing D8sd and D8max.

In the image forming optical system according to the mode, it is preferable that the fourth lens satisfies the following conditional expression (4).

$$0.35<D8sd/D8max<0.7 \qquad (4)$$

where,

D8sd, as shown in FIG. 19, denotes a distance between a virtual plane perpendicular to an optical axis, which passes through an effective diameter of an object-side surface of the fourth lens and a virtual plane perpendicular to the optical axis, which passes through an effective diameter of the image-side surface of the fourth lens, and D8max, as shown in FIG. 19, denotes the maximum value of a thickness along the optical axial direction of the fourth lens.

Here, FIG. 19 is a cross-sectional view along an optical axis showing an optical arrangement at the time of infinite object point focusing of the image pickup optical system according to the mode of the present invention, and is a diagram showing D8sd and D8max.

When an overall length in the optical axial direction of the optical system is shortened, an angle of incidence of the off-axis light beam on the fourth lens becomes large, and a length of an optical path of light rays on an upper side becomes longer than a length of an optical path of light rays on a lower side. Therefore, for correcting the coma aberration, it is necessary to impart a difference in lengths of opposite optical paths in the fourth lens. When an upper limit value of conditional expression (4) is surpassed, it is not possible to impart sufficiently the difference in the lengths of optical paths between the light rays on the upper side of the off-axis light beam and the light rays on the lower side of the off-axis light beam which passes through the fourth lens, and correction of the coma aberration becomes difficult.

When a lower limit value of conditional expression (4) is not reached, a thickness deviation ratio of the fourth lens becomes excessively large, and formability is degraded.

It is more preferable that the fourth lens satisfies the following conditional expression (4').

$$0.4<D8sd/D8max<0.65 \qquad (4')$$

It is even more preferable that the fourth lens satisfies the following conditional expression (4").

$$0.45<D8sd/D8max<0.6 \qquad (4")$$

In the image forming optical system according to the mode, it is preferable that the third lens and the fourth lens satisfy the following conditional expression (5).

$$0.5<\phi s7/\phi s8<0.7 \qquad (5)$$

where, $\phi s7$ denotes an effective diameter on the image side of the third lens, and $\phi s8$ denotes an effective diameter on the object side of the fourth lens.

Conditional expression (5) is a conditional expression which is preferable for correcting favorably an aberration of off-axis light beam.

To achieve both of a small-sizing and a telecentricity of the optical system, each of object-side surface and the image side surface of the fourth lens have to have a shape having an inflection point. When an upper limit value of conditional expression (5) is surpassed under such state, a diameter of off-axis light beam which is incident on the fourth lens becomes large. As a result, the image forming optical system is susceptible to be affected by a fluctuation in curvature of the fourth lens, and occurrence of the coma aberration and a curvature of field of high order become remarkable.

When a lower limit value of conditional expression (5) is not reached, a height of light rays of the off-axis light beam on the image-side surface of the third lens does not increase sufficiently. As a result, correction of the coma aberration and the curvature of field of high order become difficult.

In the image forming optical system according to the mode, it is preferable that the first lens, the second lens, the third lens, and the fourth lens are made of a resin.

By using a resin, it is possible to provide a low-price image pickup lens.

An image pickup apparatus according to the mode includes one of the abovementioned image forming optical systems and an auto-focusing mechanism that are integrated.

An image pickup apparatus according to the mode includes one of the abovementioned image forming optical systems and an image pickup element that are integrated.

An information processing apparatus according to the present invention comprising:

an input section used to operate the information processing apparatus, a processing section that processes at least information from the input section, an image pickup apparatus that obtains image information based on information from the processing section, an image processing section that processes the image information obtained by the image pickup apparatus, and a display section that displays the processed image, and the image pickup apparatus is one of the abovementioned image pickup apparatuses.

The information processing apparatus according to the present invention further includes a communication section, and the information processing apparatus can transmit the image information obtained by the image pickup apparatus.

The information processing apparatus according to the present invention further includes a sound obtaining section, and an information recording section.

In the information processing apparatus according to the present invention, it is preferable that the information processing apparatus is a portable electronic equipment.

In embodiments which will be described later, the aperture stop is positioned on the object side of the surface on the image side of the first lens, or more concretely, between the surface on the object side of the first lens and the surface on the image side of the first lens. Such position of the aperture stop is also included in 'the aperture stop is disposed nearest to the object side'.

EMBODIMENTS

Exemplary embodiments of an image forming optical system and an electronic image pickup apparatus according to the present invention will be described below in detail with reference to the accompanying diagrams. However, the present invention is not restricted to the embodiments described below.

Next, an image pickup optical system according to a first embodiment of the present invention will be described below. FIG. 1 is a cross-sectional view along an optical axis showing an optical arrangement at the time of infinite object point focusing of the image pickup optical system according to the first embodiment of the present invention.

FIG. 2A, FIG. 2B, FIG. 2C, and FIG. 2D are diagrams showing spherical aberration (SA), astigmatism (AS), distortion (DT), and chromatic aberration of magnification (CC) respectively, at the time of infinite object point focusing in the first embodiment. Moreover, FIY denotes an image height. Reference numerals in aberration diagrams are same for all the embodiments which will be described later.

The image pickup optical system according to the first embodiment, as shown in FIG. 1, includes in order from an object side, an aperture stop S, a biconvex positive lens L1, a negative meniscus lens L2 having a concave surface directed toward an image side, a positive meniscus lens L3 having a concave surface directed toward the object side, and a biconcave negative lens L4, and has a positive refractive power as a whole.

For all the embodiments described below, in lens cross-sectional views, CG denotes a cover glass and I denotes an image pickup surface of the electronic image pickup element.

An aspheric surface is provided to eight surfaces namely, both surfaces of the biconvex positive lens L1, both surfaces of the negative meniscus lens L2, both surfaces of the positive meniscus lens L3, and both surfaces of the biconcave negative lens L4.

Figure 3:
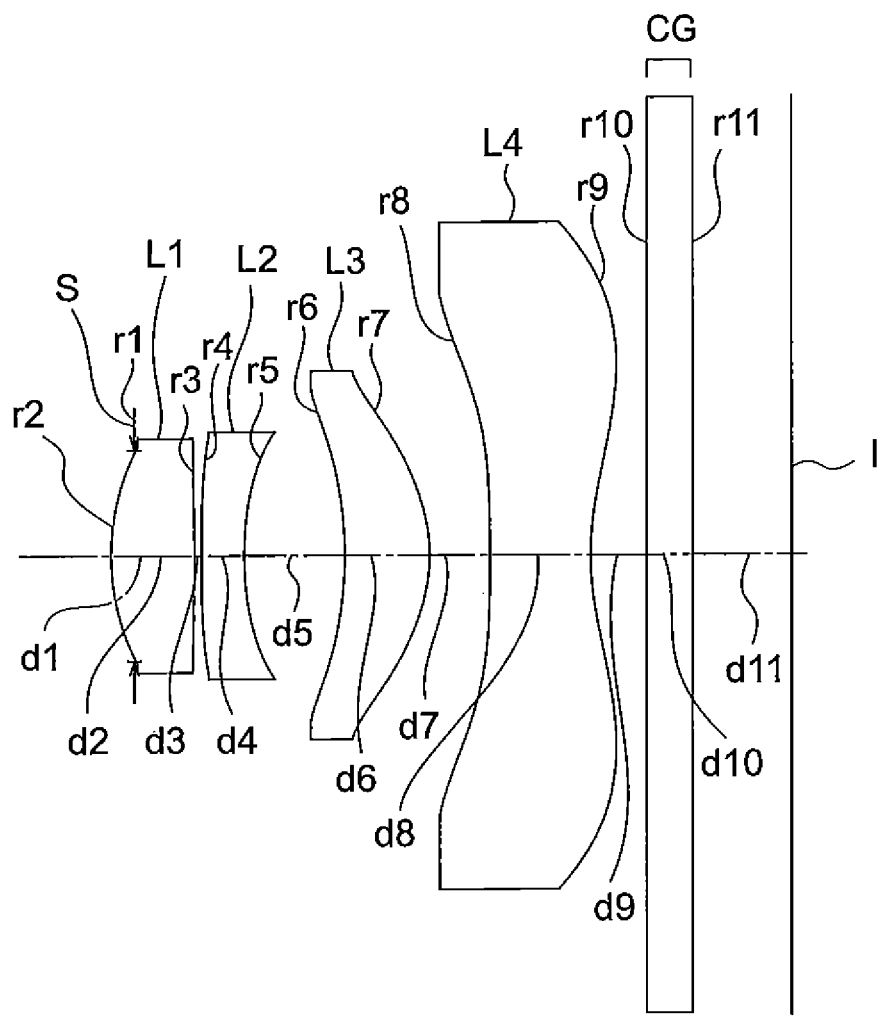
FIG. 3 is a cross-sectional view along an optical axis showing an optical arrangement at the time of infinite object point focusing of an image pickup optical system according to a second embodiment of the present invention.

Next, a zoom lens according to a second embodiment of the present invention will be described below. FIG. 3 is a cross-sectional view along an optical axis showing an optical arrangement at the time of infinite object point focusing of the zoom lens (image pickup optical system) according to the second embodiment of the present invention.

FIG. 4A, FIG. 4B, FIG. 4C, and FIG. 4D are diagrams showing spherical aberration (SA), astigmatism (AS), distortion (DT), and chromatic aberration of magnification (CC) respectively, at the time of infinite object point focusing in the second embodiment.

The zoom lens according to the second embodiment, as shown in FIG. 3, includes in order from an object side, an aperture stop S, a biconvex positive lens L1, a biconcave negative lens L2, a positive meniscus lens L3 having a concave surface directed toward the object side, and a biconcave negative lens L4, and has a positive refractive power as a whole.

An aspheric surface is provided to eight surfaces namely, both surfaces of the biconvex positive lens L1, both surfaces of the biconcave negative lens L2, both surfaces of the positive meniscus lens L3, and both surfaces of the biconcave negative lens L4.

Figure 5:
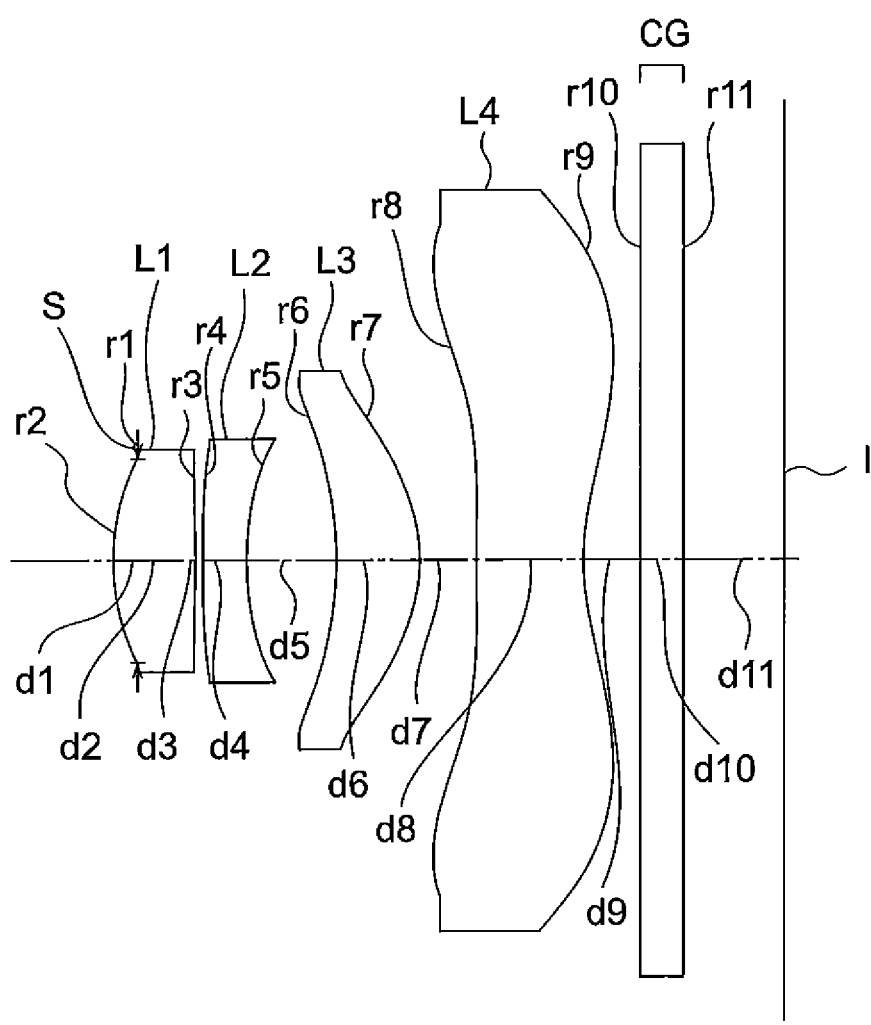
FIG. 5 is a cross-sectional view along an optical axis showing an optical arrangement at the time of infinite object point focusing of an image pickup optical system according to a third embodiment of the present invention.
Figure 6:
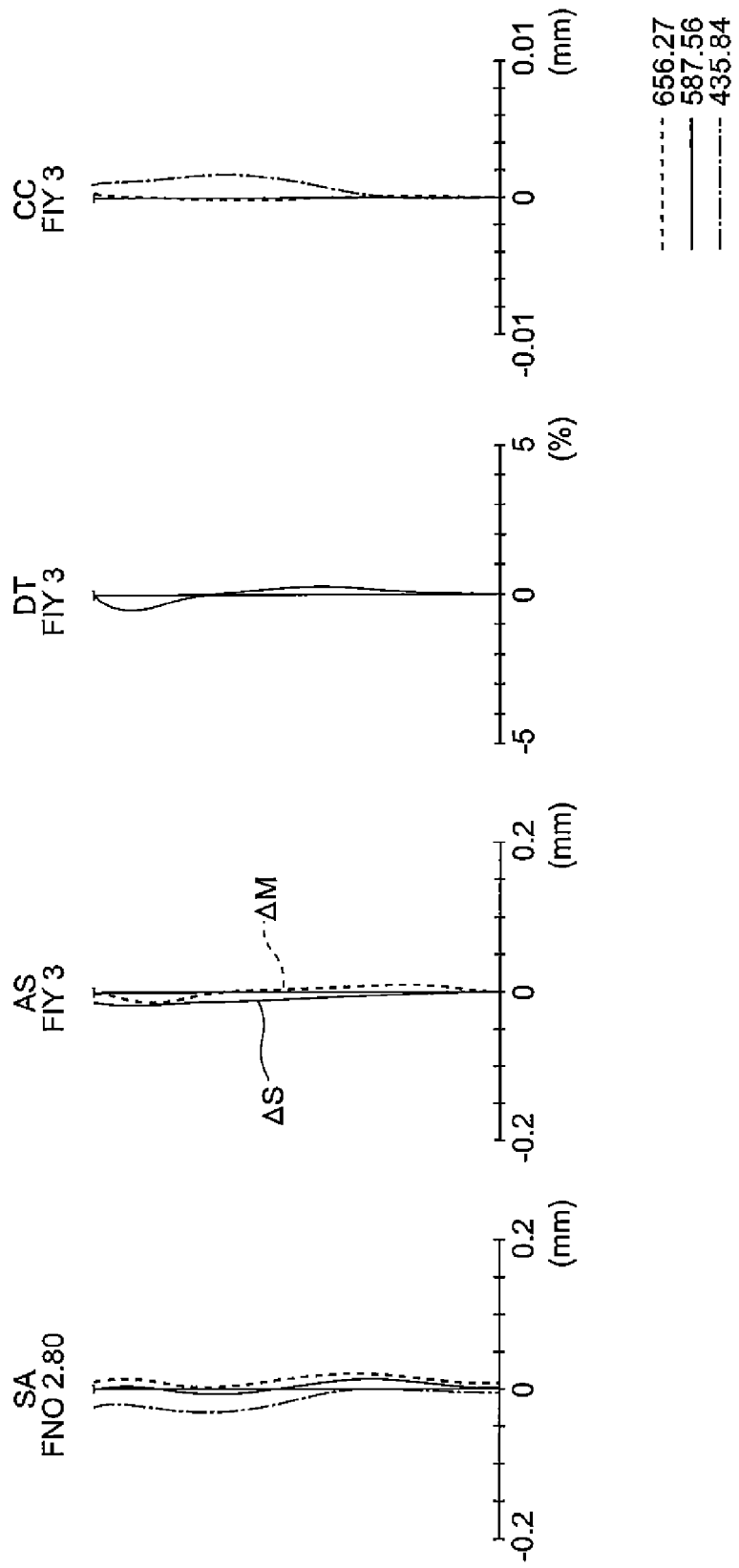
FIG. 6A, FIG. 6B, FIG. 6C, and FIG. 6D are diagrams showing spherical aberration (SA), astigmatism (AS), distortion (DT), and chromatic aberration of magnification (CC) respectively, at the time of infinite object point focusing in the third embodiment.

Next, a zoom lens according to a third embodiment of the present invention will be described below. FIG. 5 is a cross-sectional view along an optical axis showing an optical arrangement at the time of infinite object point focusing of the zoom lens according to the third embodiment of the present invention.

FIG. 6A, FIG. 6B, FIG. 6C, and FIG. 6D are diagrams showing spherical aberration (SA), astigmatism (AS), distortion (DT), and chromatic aberration of magnification (CC) respectively, at the time of infinite object point focusing in the third embodiment.

The zoom lens according to the third embodiment, as shown in FIG. 5, includes in order from an object side, an aperture stop S, a biconvex positive lens L1, a negative meniscus lens L2 having a concave surface directed toward an image side, a positive meniscus lens L3 having a concave surface directed toward the object side, and a negative meniscus lens L4 having a concave surface directed toward the image side, and has a positive refractive power as a whole.

An aspheric surface is provided to eight surfaces namely, both surfaces of the biconvex positive lens L1, both surfaces of the negative meniscus lens L2, both surfaces of the positive meniscus lens L3, and both surfaces of the negative meniscus lens L4.

Figure 7:
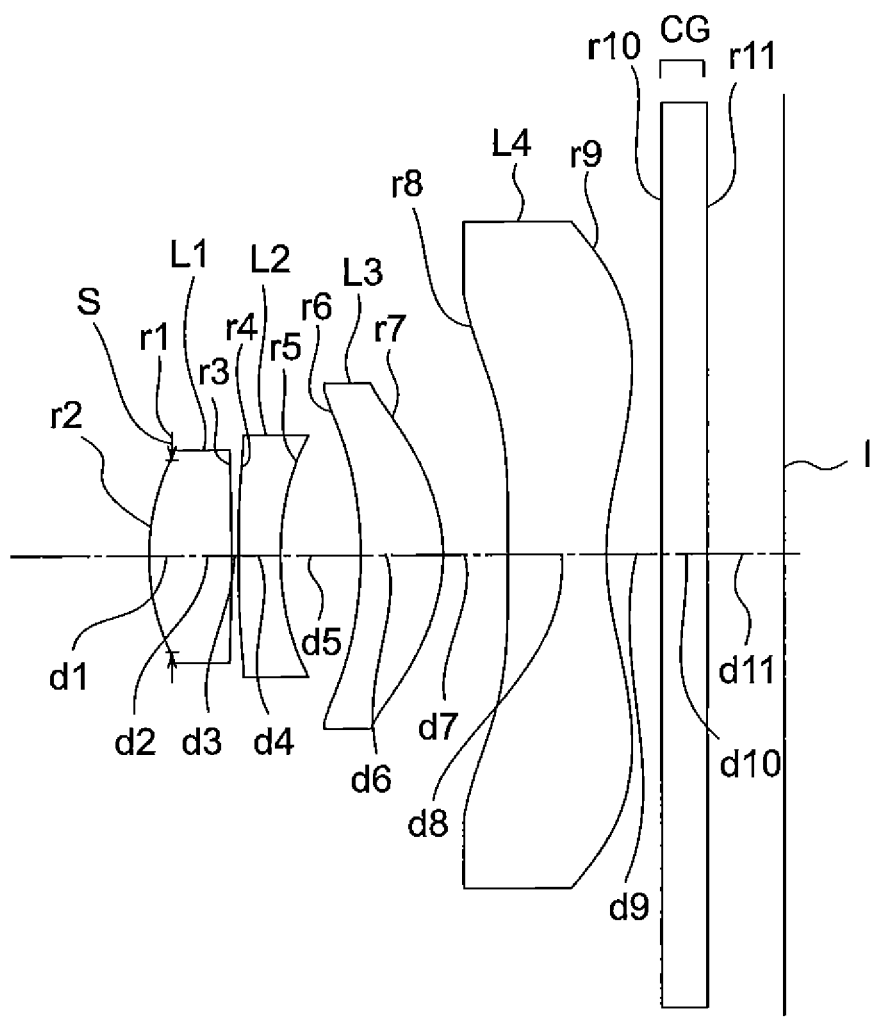
FIG. 7 is a cross-sectional view along an optical axis showing an optical arrangement at the time of infinite object point focusing of an image pickup optical system according to a forth embodiment of the present invention.
Figure 8:
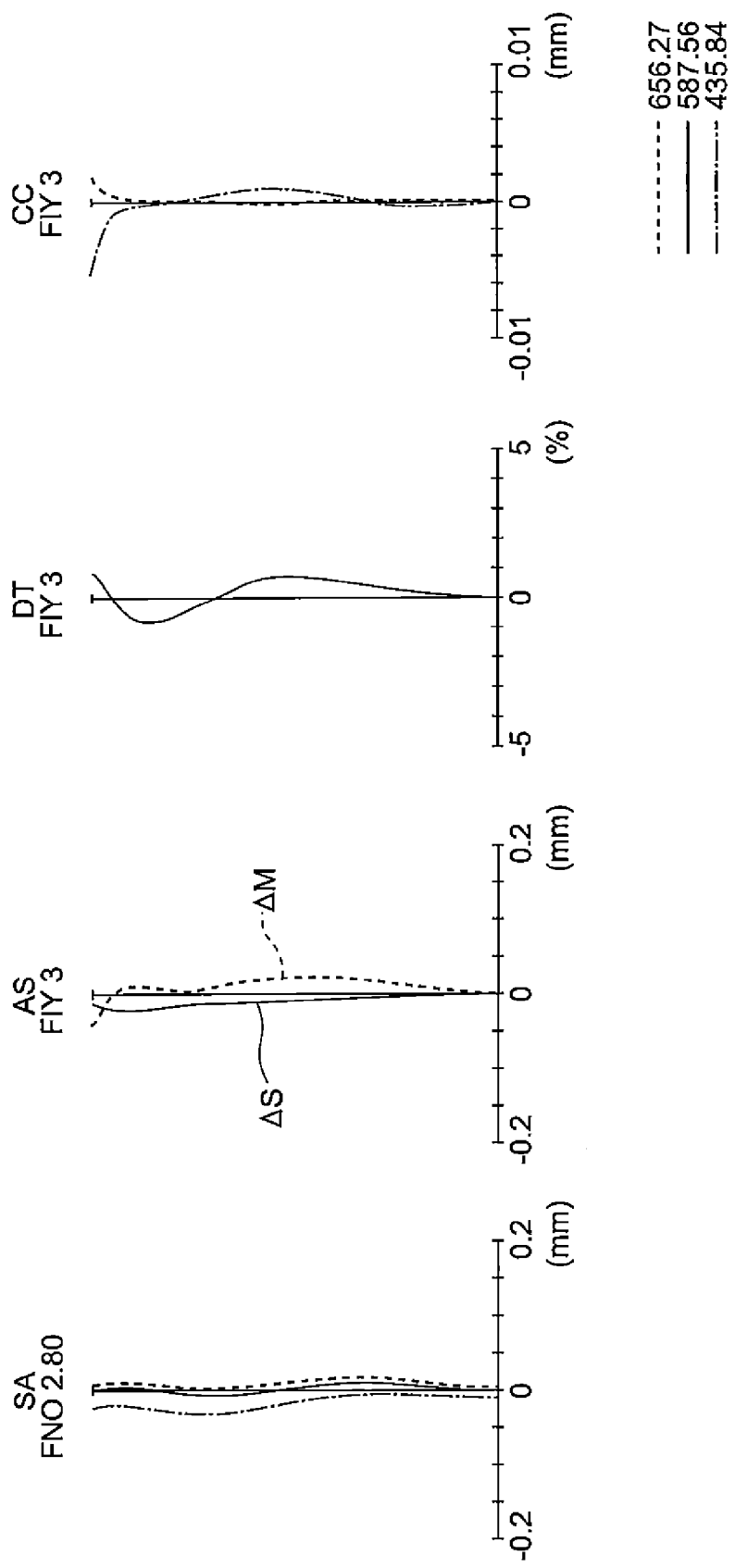
FIG. 8A, FIG. 8B, FIG. 8C, and FIG. 8D are diagrams showing spherical aberration (SA), astigmatism (AS), distortion (DT), and chromatic aberration of magnification (CC) respectively, at the time of infinite object point focusing in the fourth embodiment.

Next, a zoom lens according to a fourth embodiment of the present invention will be described below. FIG. 7 is a cross-sectional view along an optical axis showing an optical arrangement at the time of infinite object point focusing of the zoom lens according to the fourth embodiment of the present invention.

FIG. 8A, FIG. 8B, FIG. 8C, and FIG. 8D are diagrams showing spherical aberration (SA), astigmatism (AS), distortion (DT), and chromatic aberration of magnification (CC) respectively, at the time of infinite object point focusing in the fourth embodiment.

The zoom lens according to the fourth embodiment, as shown in FIG. 7, includes in order from an object side, an aperture stop S, a biconvex positive lens L1, a biconcave negative lens L2, a positive meniscus lens L3 having a concave surface directed toward the object side, and a biconcave negative lens L4, and has a positive refractive power as a whole.

An aspheric surface is provided to eight surfaces namely, both surfaces of the biconvex positive lens L1, both surfaces of the biconcave negative lens L2, both surfaces of the positive meniscus lens L3, and both surfaces of the biconcave negative lens L4.

Figure 9:
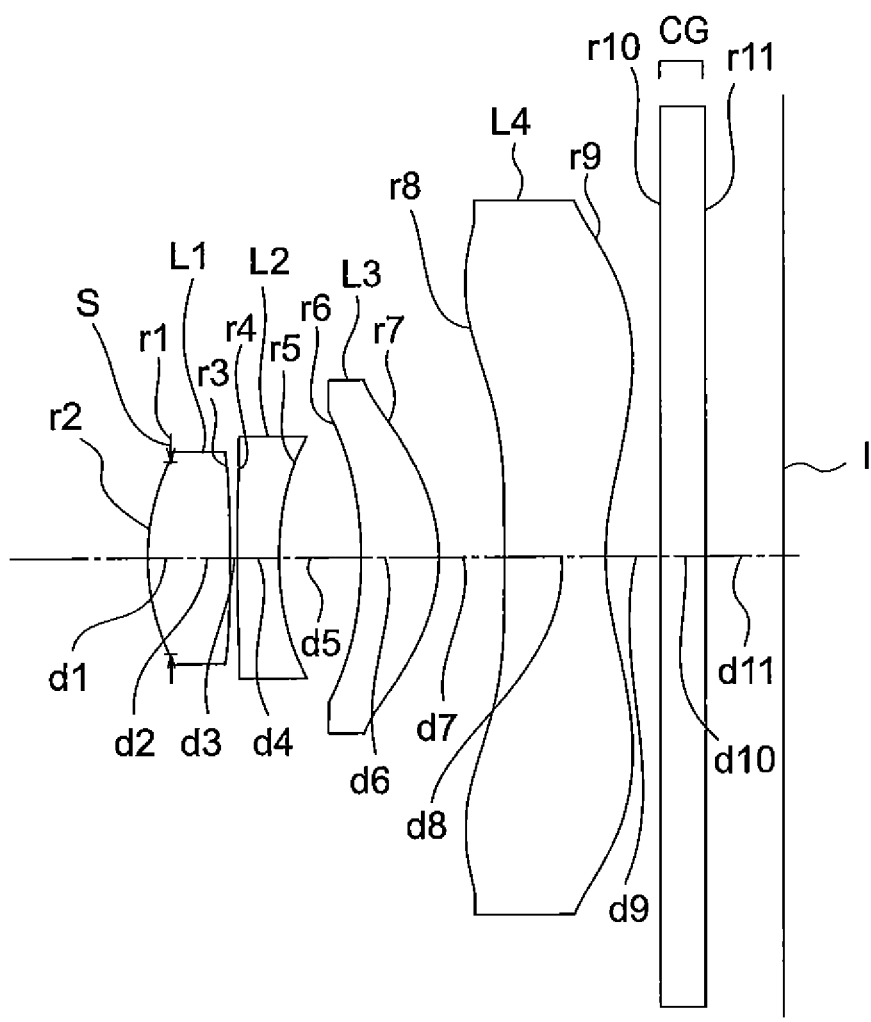
FIG. 9 is a cross-sectional view along an optical axis showing an optical arrangement at the time of infinite object point focusing of an image pickup optical system according to a fifth embodiment of the present invention.
Figure 10:
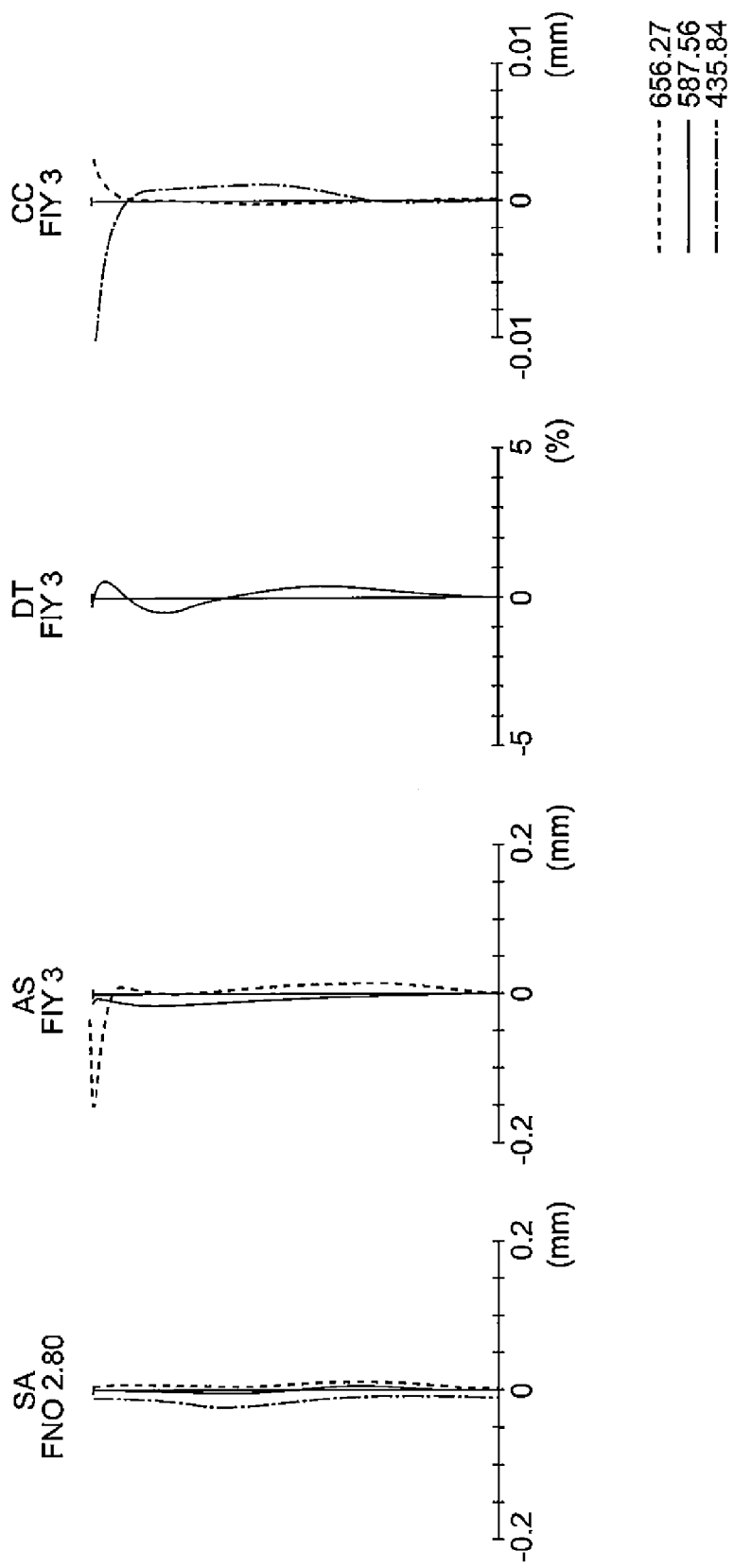
FIG. 10A, FIG. 10B, FIG. 10C, and FIG. 10D are diagrams showing spherical aberration (SA), astigmatism (AS), distortion (DT), and chromatic aberration of magnification (CC) respectively, at the time of infinite object point focusing in the fifth embodiment.

Next, a zoom lens according to a fifth embodiment of the present invention will be described below. FIG. 9 is a cross-sectional view along an optical axis showing an optical arrangement at the time of infinite object point focusing of the zoom lens according to the fifth embodiment of the present invention.

FIG. 10A, FIG. 10B, FIG. 10C, and FIG. 10D are diagrams showing spherical aberration (SA), astigmatism (AS), distortion (DT), and chromatic aberration of magnification (CC) respectively, at the time of infinite object point focusing in the fifth embodiment.

The zoom lens according to the fifth embodiment, as shown in FIG. 9, includes in order from an object side, an aperture stop S, a biconvex positive lens L1, a biconcave negative lens L2, a positive meniscus lens L3 having a concave surface directed toward the object side, and a biconcave negative lens L4, and has a positive refractive power as a whole.

An aspheric surface is provided to eight surfaces namely, both surfaces of the biconvex positive lens L1, both surfaces of the biconcave negative lens L2, both surfaces of the positive meniscus lens L3, and both surfaces of the biconcave negative lens L4.

Numerical data of optical elements which constitute image forming optical systems of each embodiment described above is shown below. Each of r1, r2, . . . denotes paraxial radius of curvature of each lens surface, each of d1, d2, . . . denotes lens thickness or an air distance between two lenses, each of nd1, nd2, . . . denotes a refractive index of each lens for a d-line, each of vd1, vd2, . . . denotes an Abbe's number for each lens, and "focal length" denotes a focal length of the entire image forming optical system. Further, * denotes an aspheric data. "fb" (back focus) is a distance which is expressed upon air conversion.

When z is let to be in an optical axis direction, y is let to be in a direction orthogonal to the optical axis, K denotes a conical coefficient, $A_4$, $A_6$, $A_8$, and $A_{10}$ denote aspherical surface coefficients, a shape of the aspheric surface is described by the following expression (I).

$$z = (y^2/r)/[1+\{1-(K+1)(y/r)^2\}^{1/2}] + A_4 y^4 + A_6 y^6 + A_8 y^8 + A_{10} y^{10} + A_{12} y^{12} \quad (I)$$

where e indicates '$10^{-n}$'. These reference signs are common in numeral data of after-mentioned each embodiment.

Example 1

| Unit mm | | | | |
|---|---|---|---|---|
| Surface data | | | | |
| Surface no. | r | d | nd | vd |
| Object plane | ∞ | ∞ | | |
| 1(stop) | ∞ | −0.15 | | |
| 2* | 1.507 | 0.55 | 1.53463 | 56.22 |
| 3* | −6.459 | 0.05 | | |
| 4* | 10050.000 | 0.28 | 1.61417 | 25.64 |
| 5* | 2.242 | 0.67 | | |
| 6* | −2.502 | 0.56 | 1.53463 | 56.22 |
| 7* | −1.135 | 0.40 | | |
| 8* | −10011.355 | 0.66 | 1.53463 | 56.22 |
| 9* | 1.718 | 0.37 | | |
| 10 | ∞ | 0.30 | 1.51633 | 64.14 |
| 11 | ∞ | 0.58 | | |
| Image plane (Image pickup surface) | ∞ | | | |

Aspherical surface data

2nd surface

K = −0.110
A4 = −1.90713e−02, A6 = 1.57537e−01, A8 = −5.48618e−01,
A10 = 7.75671e−01, A12 = −3.88019e−01, A14 = 1.01383e−01,
A16 = −1.28736e−01
3rd surface K = −115.631
A4 = 3.16443e−01, A6 = −9.40207e−01, A8 = 7.54156e−01,
A10 = 1.08283e+00, A12 = −9.35561e−01, A14 = −5.31508e−01,
A16 = −8.67950e−01
4th surface K = 0.000
A4 = 4.16132e−01, A6 = −1.01693e+00, A8 = 2.76333e−01,
A10 = 2.27397e+00, A12 = 1.75543e−01, A14 = −6.36991e+00,
A16 = 4.28154e+00
5th surface K = −0.484
A4 = 1.73898e−01, A6 = −1.60292e−01, A8 = −4.16670e−01,
A10 = 1.16705e+00, A12 = 6.37954e−01, A14 = −2.80269e+00,
A16 = 1.48334e+00
6th surface K = −9.209
A4 = −4.95475e−02, A6 = 2.80752e−02, A8 = −1.00072e−01,
A10 = 1.10994e−01, A12 = −2.78570e−02
7th surface K = −4.082
A4 = −1.85577e−01, A6 = 2.14728e−01, A8 = −2.62073e−01,
A10 = 1.90330e−01, A12 = −4.57061e−02
8th surface -continued

| Unit mm |
|---|

K = −1000.000
A4 = −8.28932e−02, A6 = −5.76391e−03, A8 = 2.09303e−02,
A10 = −6.87097e−03, A12 = 9.50540e−04, A14 = −5.06808e−05
9th surface K = −7.016
A4 = −8.03214e−02, A6 = 2.47194e−02, A8 = −6.96695e−03,
A10 = 1.12076e−03, A12 = −9.64957e−05, A14 = 4.18886e−06

| Various data | |
|---|---|
| fb (in air) | 1.15 |
| Lens total length (in air) | 4.30 |
| Focal length | 3.73 |
| φs7 | 2.56 |
| φs8 | 4.14 |

Example 2

| Unit mm | | | | |
|---|---|---|---|---|
| Surface data | | | | |
| Surface no. | r | d | nd | vd |
| Object plane | ∞ | ∞ | | |
| 1(stop) | ∞ | −0.15 | | |
| 2* | 1.502 | 0.55 | 1.53463 | 56.22 |
| 3* | −6.561 | 0.05 | | |
| 4* | −571.855 | 0.28 | 1.61417 | 25.64 |
| 5* | 2.238 | 0.66 | | |
| 6* | −2.506 | 0.56 | 1.53463 | 56.22 |
| 7* | −1.112 | 0.40 | | |
| 8* | −15.131 | 0.66 | 1.53463 | 56.22 |
| 9* | 1.757 | 0.37 | | |
| 10 | ∞ | 0.30 | 1.51633 | 64.14 |
| 11 | ∞ | 0.64 | | |
| Image plane (Image pickup surface) | ∞ | | | |

Aspherical surface data

2nd surface

K = −0.110
A4 = −1.93085e−02, A6 = 1.55368e−01, A8 = −5.47918e−01,
A10 = 7.77198e−01, A12 = −3.92170e−01, A14 = 7.88060e−02,
A16 = −1.93827e−01
3rd surface K = −115.631
A4 = 3.15744e−01, A6 = −9.37683e−01, A8 = 7.53501e−01,
A10 = 1.08033e+00, A12 = −9.33963e−01, A14 = −5.17483e−01,
A16 = −8.31978e−01
4th surface K = 0.000
A4 = 4.17787e−01, A6 = −1.02008e+00, A8 = 2.76335e−01,
A10 = 2.27888e+00, A12 = 1.84807e−01, A14 = −6.35248e+00,
A16 = 4.32215e+00
5th surface K = −0.484
A4 = 1.70593e−01, A6 = −1.72968e−01, A8 = −4.17115e−01,
A10 = 1.20098e+00, A12 = 6.84735e−01, A14 = −2.78248e+00,
A16 = 1.43567e+00
6th surface K = −9.209
A4 = −5.62412e−02, A6 = 2.84353e−02, A8 = −9.90392e−02,
A10 = 1.11819e−01, A12 = −2.73219e−02
7th surface -continued Unit mm K = −4.082
A4 = −1.82329e−01, A6 = 2.15072e−01, A8 = −2.62143e−01,
A10 = 1.90248e−01, A12 = −4.57476e−02
8th surface K = −1000.000
A4 = −8.31237e−02, A6 = −5.75539e−03, A8 = 2.09312e−02,
A10 = −6.87169e−03, A12 = 9.50100e−04, A14 = −5.08576e−05
9th surface K = −7.016
A4 = −7.74929e−02, A6 = 2.46838e−02, A8 = −6.98880e−03,
A10 = 1.11746e−03, A12 = −9.68984e−05, A14 = 4.14504e−06

Various data

| | |
|---|---|
| fb (in air) | 1.21 |
| Lens total length (in air) | 4.35 |
| Focal length | 3.86 |
| φs7 | 2.42 |
| φs8 | 3.44 |

Example 3

Unit mm

Surface data

| Surface no. | r | d | nd | νd |
|---|---|---|---|---|
| Object plane | ∞ | ∞ | | |
| 1(stop) | ∞ | −0.17 | | |
| 2* | 1.618 | 0.57 | 1.53463 | 56.22 |
| 3* | −7.207 | 0.05 | | |
| 4* | 228.031 | 0.31 | 1.61417 | 25.64 |
| 5* | 2.396 | 0.63 | | |
| 6* | −2.572 | 0.59 | 1.53463 | 56.22 |
| 7* | −1.212 | 0.40 | | |
| 8* | 17.891 | 0.75 | 1.53463 | 56.22 |
| 9* | 1.636 | 0.40 | | |
| 10 | ∞ | 0.30 | 1.51633 | 64.14 |
| 11 | ∞ | 0.70 | | |
| Image plane (Image pickup surface) | ∞ | | | |

Aspherical surface data

2nd surface

K = −0.110
A4 = −1.48295e−02, A6 = 9.40672e−02, A8 = −2.81596e−01,
A10 = 3.31236e−01, A12 = −1.34793e−01, A14 = 2.40126e−02,
A16 = −5.21207e−02
3rd surface K = −115.631
A4 = 2.36954e−01, A6 = −5.81551e−01, A8 = 3.83617e−01,
A10 = 4.53290e−01, A12 = −3.31586e−01, A14 = −1.49716e−01,
A16 = −1.86925e−01
4th surface K = 0.000
A4 = 3.12217e−01, A6 = −6.36115e−01, A8 = 1.41947e−01,
A10 = 9.67935e−01, A12 = 6.57894e−02, A14 = −1.84299e+00,
A16 = 1.01946e+00
5th surface K = −0.484
A4 = 1.27892e−01, A6 = −1.06713e−01, A8 = −2.15294e−01,
A10 = 5.05482e−01, A12 = 2.37596e−01, A14 = −8.02847e−01,
A16 = 3.55007e−01

-continued

Unit mm

6th surface

K = −9.209
A4 = −3.98414e−02, A6 = 1.61549e−02, A8 = −5.18492e−02,
A10 = 4.69838e−02, A12 = −9.79313e−03
7th surface K = −4.082
A4 = −1.39700e−01, A6 = 1.33882e−01, A8 = −1.34023e−01,
A10 = 8.09145e−02, A12 = −1.59378e−02
8th surface K = −1000.000
A4 = −6.25693e−02, A6 = −3.65916e−03, A8 = 1.07249e−02,
A10 = −2.91644e−03, A12 = 3.33416e−04, A14 = −1.43173e−05
9th surface K = −7.016
A4 = −5.82346e−02, A6 = 1.55767e−02, A8 = −3.57040e−03,
A10 = 4.73891e−04, A12 = −3.41308e−05, A14 = 1.16100e−06

Various data

| | |
|---|---|
| fb (in air) | 1.30 |
| Lens total length (in air) | 4.60 |
| Focal length | 4.01 |
| φs7 | 2.64 |
| φs8 | 4.70 |

Example 4

Unit mm

Surface data

| Surface no. | r | d | nd | νd |
|---|---|---|---|---|
| Object plane | ∞ | ∞ | | |
| 1(stop) | ∞ | −0.15 | | |
| 2* | 1.456 | 0.55 | 1.53463 | 56.22 |
| 3* | −6.897 | 0.05 | | |
| 4* | −2258.800 | 0.28 | 1.61417 | 25.64 |
| 5* | 2.235 | 0.53 | | |
| 6* | −2.578 | 0.55 | 1.53463 | 56.22 |
| 7* | −1.151 | 0.43 | | |
| 8* | −2318.621 | 0.65 | 1.53463 | 56.22 |
| 9* | 1.718 | 0.37 | | |
| 10 | ∞ | 0.30 | 1.51633 | 64.14 |
| 11 | ∞ | 0.51 | | |
| Image plane (Image pickup surface) | ∞ | | | |

Aspherical surface data

2nd surface

K = −0.139
A4 = −2.03864e−02, A6 = 1.54881e−01, A8 = −5.45334e−01,
A10 = 7.84512e−01, A12 = −3.81369e−01, A14 = 7.97110e−02,
A16 = −2.49767e−01
3rd surface K = −103.695
A4 = 3.16688e−01, A6 = −9.40389e−01, A8 = 7.40155e−01,
A10 = 1.04452e+00, A12 = −1.00527e+00, A14 = −6.19137e−01,
A16 = −8.83722e−01
4th surface K = 9670017.870
A4 = 4.12487e−01, A6 = −1.02794e+00, A8 = 2.67605e−01,
A10 = 2.26426e+00, A12 = 1.43647e−01, A14 = −6.50831e+00,
A16 = 3.81163e+00

-continued

Unit mm

5th surface

K = −0.584
A4 = 1.72756e−01, A6 = −1.58103e−01, A8 = −4.02298e−01,
A10 = 1.16951e+00, A12 = 5.44591e−01, A14 = −2.96841e+00,
A16 = 1.59351e+00

6th surface

K = −8.186
A4 = −5.41989e−02, A6 = 2.49229e−02, A8 = −1.01353e−01,
A10 = 1.10454e−01, A12 = −2.82340e−02

7th surface

K = −4.093
A4 = −1.85650e−01, A6 = 2.15409e−01, A8 = −2.61729e−01,
A10 = 1.90441e−01, A12 = −4.56744e−02

8th surface

K = −9565019.263
A4 = −8.28243e−02, A6 = −5.75976e−03, A8 = 2.09300e−02,
A10 = −6.87118e−03, A12 = 9.50462e−04, A14 = −5.07049e−05

9th surface

K = −6.491
A4 = −7.98649e−02, A6 = 2.47472e−02, A8 = −6.97247e−03,
A10 = 1.11970e−03, A12 = −9.66188e−05, A14 = 4.17267e−06

Various data

| fb (in air) | 1.07 |
| Lens total length (in air) | 4.11 |
| Focal length | 3.54 |
| φs7 | 2.28 |
| φs8 | 3.66 |

Example 5

Unit mm

Surface data

| Surface no. | r | d | nd | vd |
|---|---|---|---|---|
| Object plane | ∞ | ∞ | | |
| 1(stop) | ∞ | −0.15 | | |
| 2* | 1.463 | 0.55 | 1.53463 | 56.22 |
| 3* | −6.884 | 0.05 | | |
| 4* | −2262.705 | 0.28 | 1.61417 | 25.64 |
| 5* | 2.229 | 0.55 | | |
| 6* | −2.627 | 0.52 | 1.53463 | 56.22 |
| 7* | −1.169 | 0.43 | | |
| 8* | −2788.366 | 0.67 | 1.53463 | 56.22 |
| 9* | 1.718 | 0.37 | | |
| 10 | ∞ | 0.30 | 1.51633 | 64.14 |
| 11 | ∞ | 0.52 | | |
| Image plane (Image pickup surface) | ∞ | | | |

Aspherical surface data

2nd surface

K = −0.235
A4 = −2.76954e−02, A6 = 1.48336e−01, A8 = −5.33930e−01,
A10 = 7.81816e−01, A12 = −4.25614e−01, A14 = 5.17623e−02,
A16 = −3.49565e−01

3rd surface

K = −9.579
A4 = 2.64908e−01, A6 = −9.49443e−01, A8 = 7.14918e−01,
A10 = 1.03706e+00, A12 = −9.87431e−01, A14 = −6.00998e−01,
A16 = −8.78512e−01

-continued

Unit mm

4th surface

K = 9646668.461
A4 = 3.52285e−01, A6 = −1.04991e+00, A8 = 3.29078e−01,
A10 = 2.25296e+00, A12 = 7.51096e−02, A14 = −6.64613e+00,
A16 = 4.10061e+00

5th surface

K = −0.851
A4 = 1.52746e−01, A6 = −8.10654e−02, A8 = −5.13915e−01,
A10 = 1.14627e+00, A12 = 5.62090e−01, A14 = −2.93801e+00,
A16 = 1.78280e+00

6th surface

K = −3.072
A4 = −6.13520e−02, A6 = 3.58500e−02, A8 = −9.90242e−02,
A10 = 1.14086e−01, A12 = −4.04065e−02

7th surface

K = −4.464
A4 = −2.15279e−01, A6 = 2.18995e−01, A8 = −2.57562e−01,
A10 = 1.92028e−01, A12 = −4.53413e−02

8th surface

K = −873468281904.200
A4 = −7.77002e−02, A6 = −5.85360e−03, A8 = 2.09113e−02,
A10 = −6.87374e−03, A12 = 9.50254e−04, A14 = −5.06446e−05

9th surface

K = −6.438
A4 = −7.77220e−02, A6 = 2.52121e−02, A8 = −6.95746e−03,
A10 = 1.11835e−03, A12 = −9.67326e−05, A14 = 4.21754e−06

Various data

| fb (in air) | 1.08 |
| Lens total length (in air) | 4.13 |
| Focal length | 3.59 |
| φs7 | 2.40 |
| φs8 | 4.48 |

Next, parameter and values of conditional expressions in each of embodiments described above are described.

| | Conditional expressions | Example 1 | Example 2 | Example 3 |
|---|---|---|---|---|
| No. 1 | θ9 | 41 | 42 | 39 |
| No. 2 | TL/2Y | 0.73 | 0.74 | 0.78 |
| No. 3 | (r8 + r9)/(r8 − r9) | 1.00 | 0.79 | 1.20 |
| No. 4 | D8sd/D8max | 0.54 | 0.71 | 0.59 |
| No. 5 | φs7/φs8 | 0.62 | 0.70 | 0.56 |

| | Conditional expressions | Example 4 | Example 5 |
|---|---|---|---|
| No. 1 | θ9 | 41 | 31 |
| No. 2 | TL/2Y | 0.70 | 0.70 |
| No. 3 | (r8 + r9)/(r8 − r9) | 1.00 | 1.00 |
| No. 4 | D8sd/D8max | 0.62 | 0.61 |
| No. 5 | φs7/φs8 | 0.62 | 0.54 |

Thus, it is possible to use such image forming optical system (image pickup optical system) of the present invention in an image pickup apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Modes thereof will be exemplified below.

(Information Processing Apparatus)

The above-described zoom lens or the image pickup apparatus equipped with the zoom lens according to the present invention can be incorporated in an information processing apparatus such as portable electronic equipment. Examples of the information processing apparatus include, but not limited to, a digital camera as portable electronic equipment, a personal computer, and a cellular phone. The information processing apparatus according to the present invention is not limited to portable electronic equipment.

Figure 20:
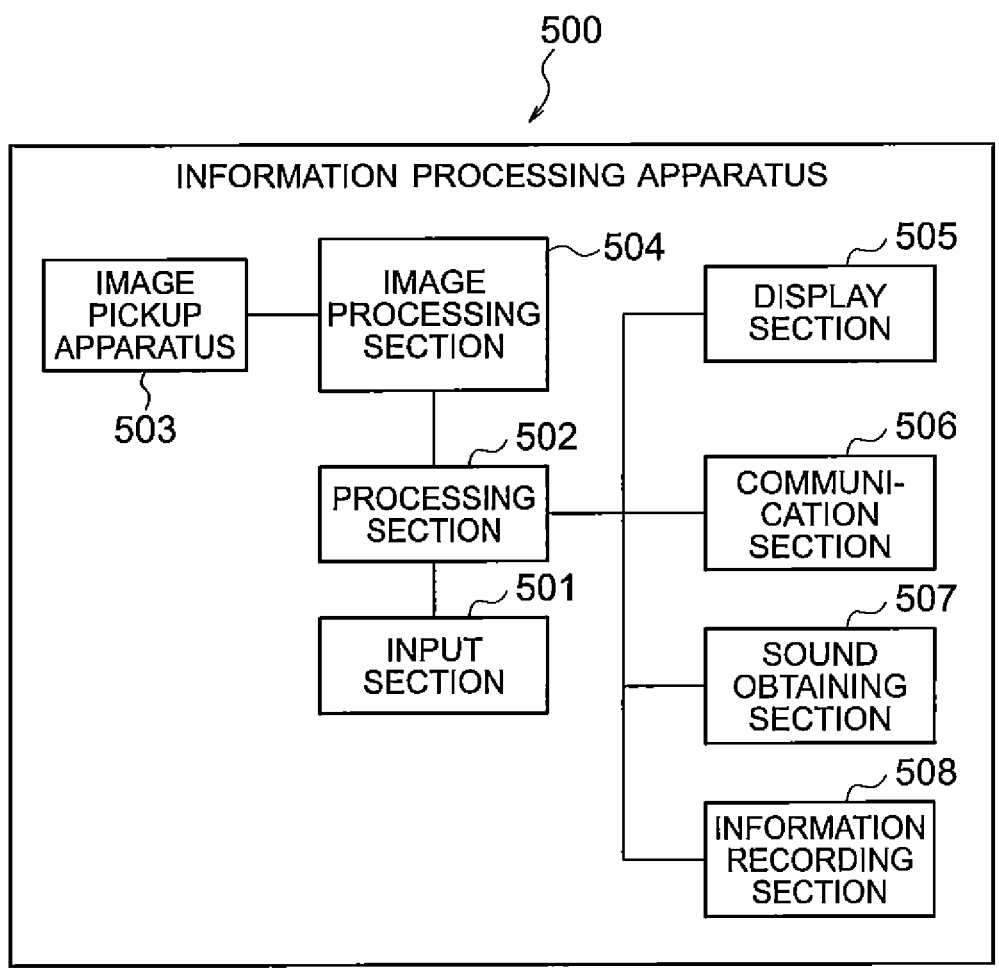
FIG. 20 a block diagram showing a configuration of a processing section of an information processing system.

FIG. 20 is a block diagram of such an information processing apparatus. The information processing apparatus 500 has an input section (portion) 501, a processing section 502, an image pickup apparatus 503, an image processing section 504, and a display section 505. It is preferred that the information processing apparatus further have a communication section 506, a sound obtaining section 507, and an information recording section 508, as shown in FIG. 17.

The input section 501 is used to operate the information processing apparatus 500. The processing section 502 processes, at least, information from the input section 501. The image pickup apparatus 503 obtains image information based on information from the processing section 502. The image processing section 504 processes the image information obtained by the image pickup apparatus 503. The display section displays the processed image. The image pickup apparatus 503 is equipped with a zoom lens according to the present invention.

The communication section 506 is configured to be capable of transmitting (communicating) the image information obtained by the image pickup apparatus 503. The sound obtaining section 507 is configured to obtain sound (or voice) information, and the information recording section 509 records the obtained image information and/or sound information.

Figure 11:
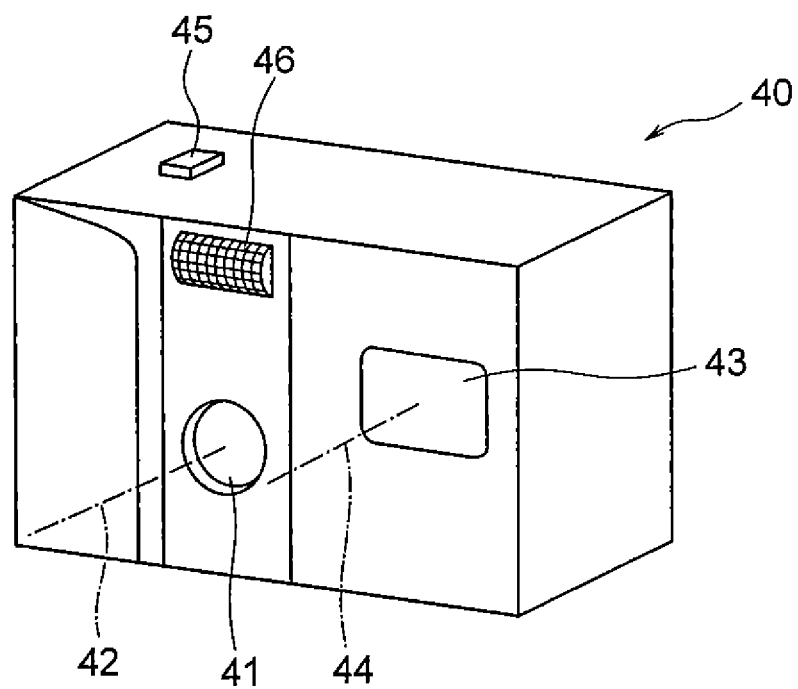
FIG. 11 is a front perspective view showing an appearance of a digital camera 40 in which, an image pickup optical system according to the present invention is incorporated.
Figure 12:
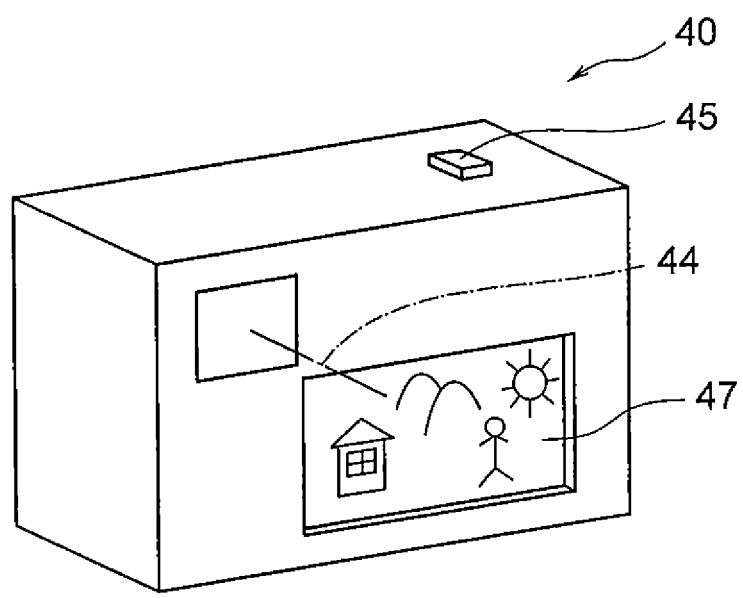
FIG. 12 is a rear perspective view of the digital camera 40.
Figure 13:
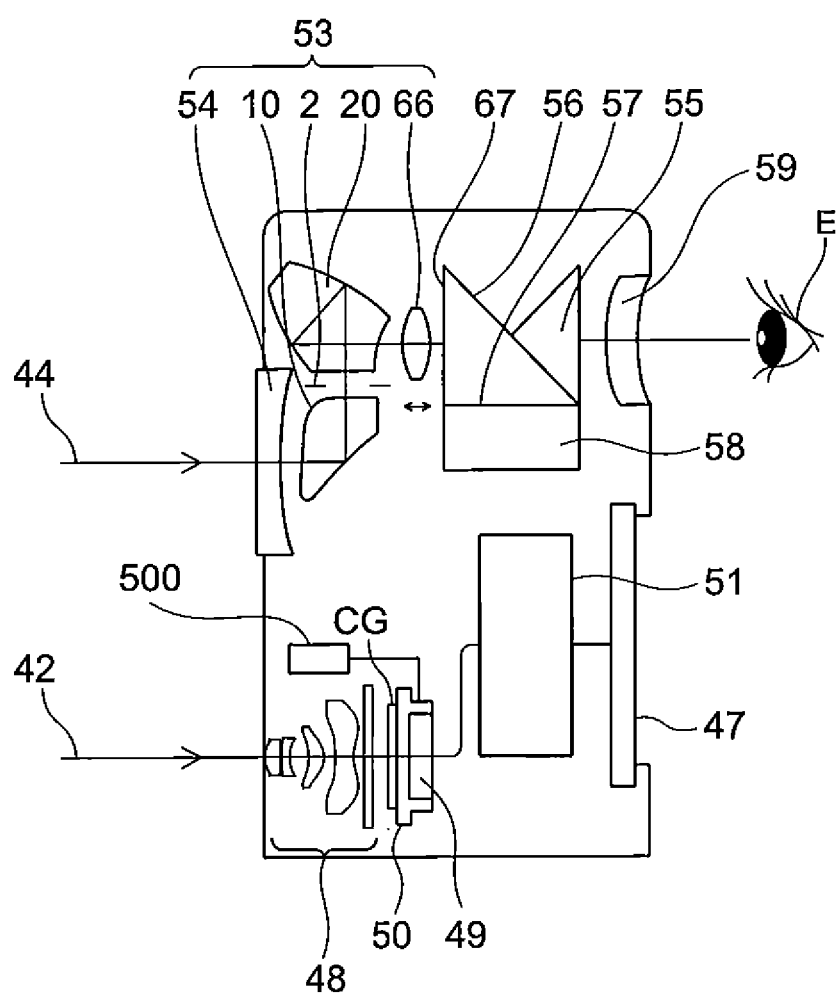
FIG. 13 is a cross-sectional view of an optical arrangement of the digital camera 40.

In FIG. 11 to FIG. 13 show conceptual diagrams of structures in which the image forming optical system according to the present invention is incorporated in a photographic optical system 41 of a digital camera. FIG. 11 is a frontward perspective view showing an appearance of a digital camera 40, FIG. 12 is a rearward perspective view of the same, and FIG. 13 is a cross-sectional view showing an optical arrangement of the digital camera 40.

The digital camera 40, in a case of this example, includes the photographic optical system 41 having an optical path for photography 42, a finder optical system 43 having an optical path for finder 44, a shutter button 45, a flash 46, and a liquid-crystal display monitor 47. Moreover, when the shutter button 45 disposed at an upper portion of the camera 40 is pressed, in conjugation with this, a photograph is taken through the photographic optical system 41 such as the objective optical system for photography 48 in the first embodiment.

An object image formed by the photographic optical system 41 is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording electronically by a flexible disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image to an eyeball E of the observer is disposed.

By the digital camera 40 structured in such manner, it is possible to realize an electronic image pickup apparatus having a zoom lens with a reduced size and thickness, in which the number of structural components of the photographic optical system 41 is reduced. Further, the present invention could be applied not only the above-mentioned collapsible type digital camera but also a bending type digital camera having a bending optical system.

The digital camera 40 includes an auto-focusing mechanism 500 which is integrated with an image pickup optical system. By installing the auto-focusing mechanism 500, it is possible to focus at any object distance.

Moreover, it is desirable that the image pickup optical system and an electronic image pickup element chip (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image, it is possible to provide a digital camera (an image pickup apparatus) having a small size and an improved performance.

Figure 14:
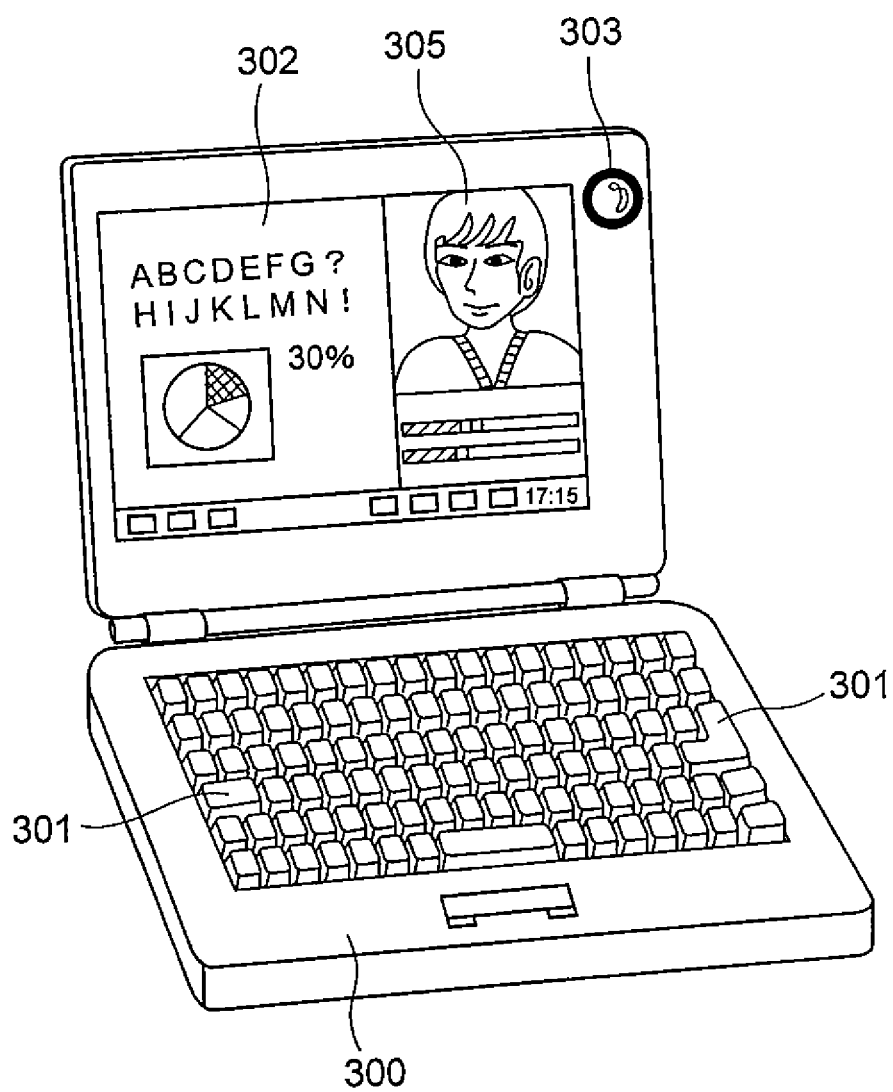
FIG. 14 is a front-perspective view of a state in which, a cover of a personal computer 300 which is an example of an information processing system in which, the image pickup optical system according to the present invention is built-in as an objective optical system, is opened.
Figure 15:
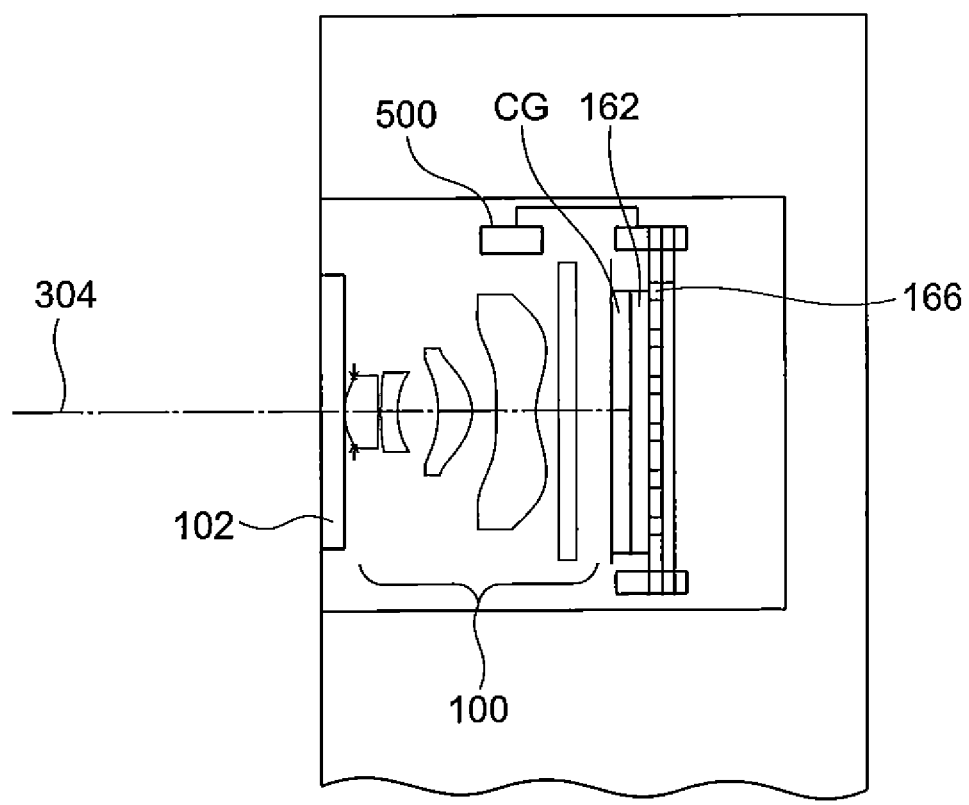
FIG. 15 is a cross-sectional view of a photographic optical system 303 of the personal computer 300.
Figure 16:
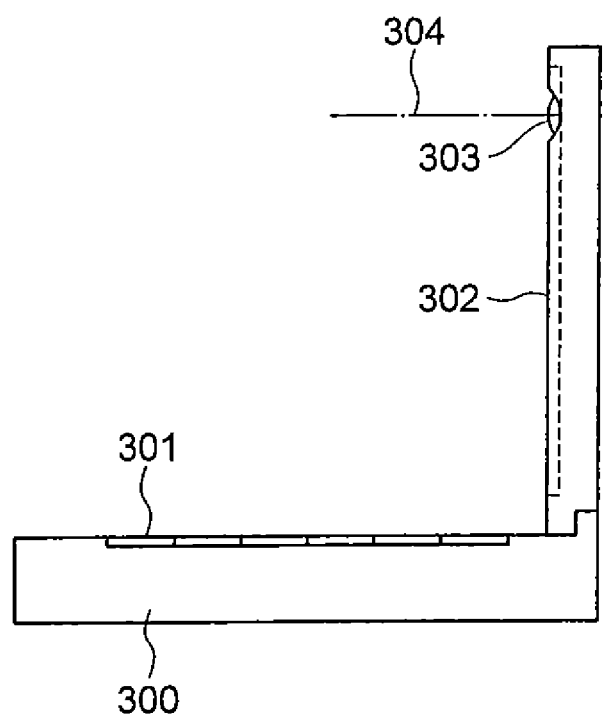
FIG. 16 is a side view of the personal computer 300.

Next, a personal computer which is an example of an information processing apparatus with a built-in image forming system as an objective optical system is shown in FIG. 14 to FIG. 16. FIG. 14 is a frontward perspective view of a personal computer 300 with its cover opened, FIG. 15 is a cross-sectional view of a photographic optical system 303 of the personal computer 300, and FIG. 16 is a side view of FIG. 14. As it is shown in FIG. 14 to FIG. 16, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed. At a front surface side of the electronic image pickup element chip 162, a cover glass CG is disposed.

An object image received at the electronic image pickup element chip 162 is input to a processing means of the personal computer 300 via a terminal 166. Further, the object image is displayed as an electronic image on the monitor 302. In FIG. 14, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

The personal computer includes an auto-focusing mechanism 500 which is integrated with an objective optical system 100 (image pickup optical system). By installing the auto-focusing mechanism 500, it is possible to focus at any object distance.

Moreover, it is desirable that the objective optical system 100 (image pickup optical system) and an electronic image pickup element chip 162 (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image, it is possible to provide a personal computer (an image pickup apparatus) having a small size and an improved performance.

Figure 17A:
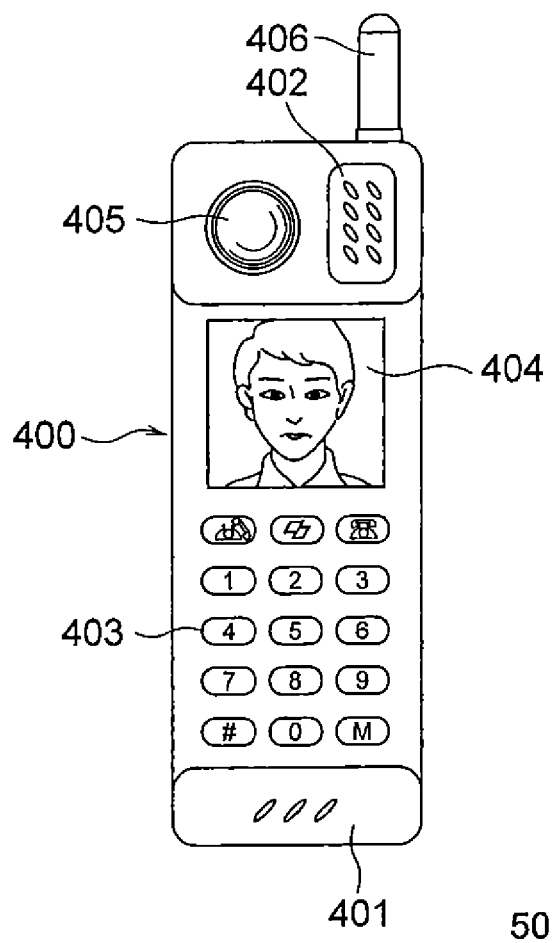
FIG. 17A, FIG. 17B, and FIG. 17C are diagrams showing a mobile telephone which is an example of an information processing apparatus in which, the image pickup optical system according to the present invention is built-in as a photographic optical system, where.
Figure 17B:
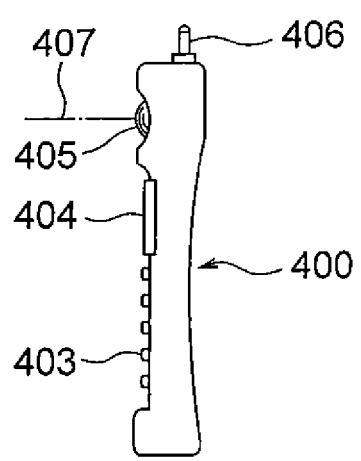
Figure 17C:
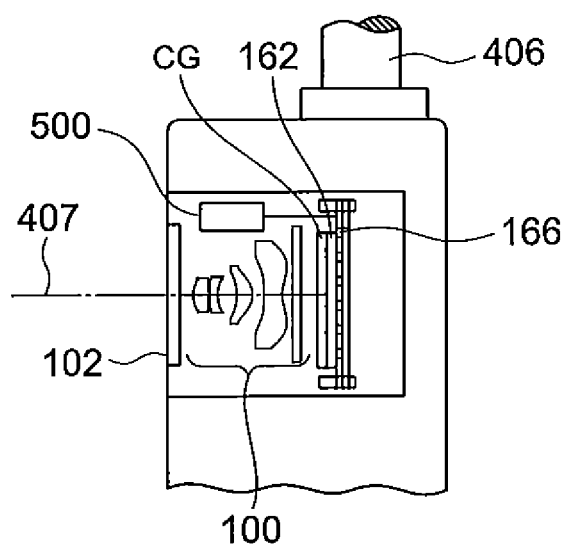

Next, a telephone which is an example of an information processing apparatus in which the image forming optical system of the present invention is built-in as a photographic optical system, particularly a portable telephone which is easy to carry is shown in FIG. 17A, FIG. 17B, and FIG. 17C. FIG. 17A is a front view of a portable telephone 400, FIG. 17B is a side view of the portable telephone 400, and FIG. 17C is a cross-sectional view of a photographic optical system 405. As shown in FIG. 17A to FIG. 17C, the portable telephone 400 includes a microphone section 401, a speaker section 402, an input button 403, a monitor 404, the photographic optical system 405, an antenna 406, and a processing means.

Here, the microphone section 401 is for inputting a voice of the operator as information. The speaker section 402 is for outputting a voice of the communication counterpart. The input button 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

The telephone includes an auto-focusing mechanism 500 which is integrated with an objective optical system 100 (image pickup optical system). By installing the auto-focusing mechanism 500, it is possible to focus at any object distance.

Moreover, it is desirable that the objective optical system 100 (image pickup optical system) and an electronic image pickup element chip 162 (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image, it is possible to provide a telephone (an image pickup apparatus) having a small size and an improved performance.

Figure 21:
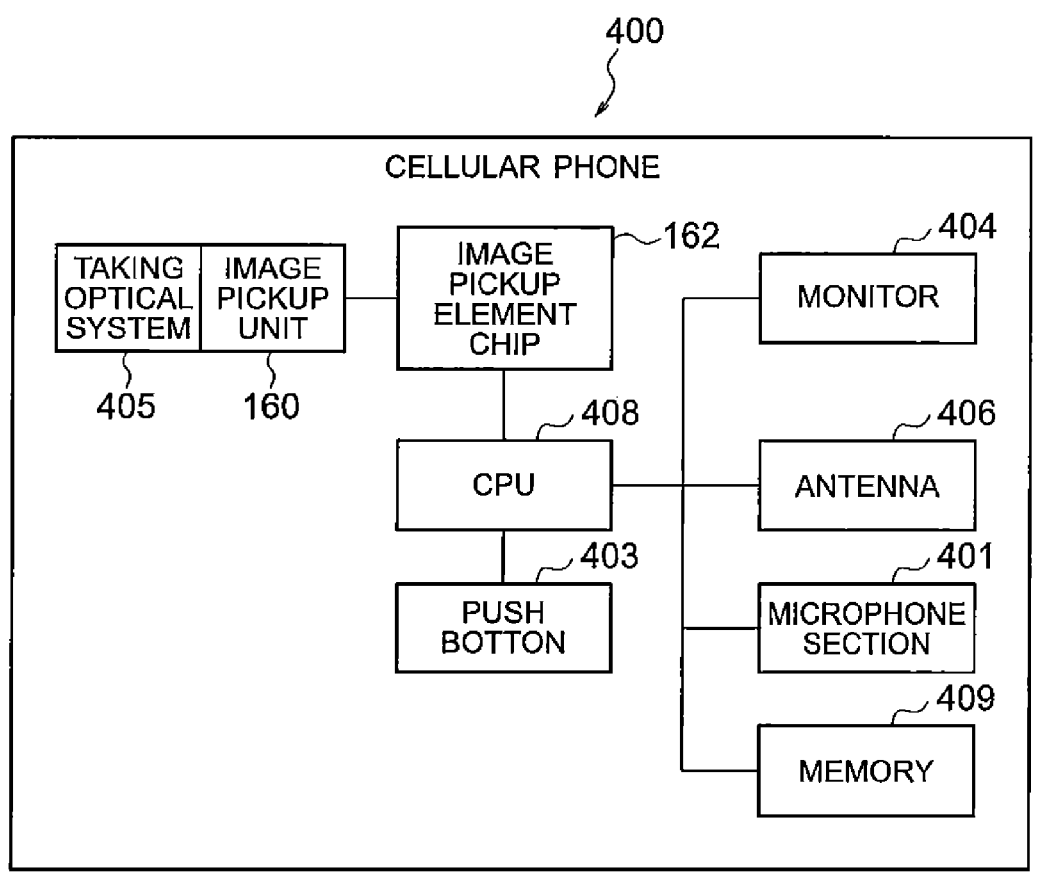
FIG. 21 is a block diagram showing a configuration of a processing section of a mobile telephone.

FIG. 21 is a block diagram of the cellular phone 400. In the cellular phone 400, the push button 403 corresponds to the input section 501 of the information processing apparatus 500, the taking optical system 405 and an image pickup unit 160 correspond to the image pickup apparatus 503, the image pickup element chip 162 corresponds to the image processing section 504, the monitor 404 corresponds to the display section 505, the antenna 406 corresponds to the communication section 506, and the microphone unit 401 corresponds to the sound obtaining section 507. Furthermore, a CPU 408 corresponds to the processing section 502, and a built-in memory 409 corresponds to the information recording section 508.

The present invention can have various modifications which fairly fall within the basic teaching herein set forth.

As it has been described above, the image forming optical system, and the image pickup apparatus using the same, are useful for an image forming optical system in which, it is sought to suppress an occurrence of a ghost image and a flare, while facilitating widening of an angle of field and shortening of the overall length of the optical system, and for an image pickup apparatus using the same.

The image forming optical system, and the image pickup apparatus using the same, show an effect that it is possible to suppress an occurrence of a ghost image and a flare which may be problematic when widening of an angle of field and shortening of the overall length of the optical system are facilitated.

What is claimed is:

1. An image forming optical system of four lenses, comprising in order from an object side:
   a first lens having a positive refractive power, which is a biconvex lens;
   a second lens having a negative refractive power, of which, an image-side surface is a concave surface;
   a third lens having a positive refractive power, which is meniscus-shaped with a concave surface directed toward the object side;

a fourth lens having a negative refractive power, of which, an image-side surface is a concave surface; and an aperture stop which is disposed nearest to the object side, wherein the image forming optical system satisfies the following conditional expressions (1) and (2)

$$\theta 9 < 48 \quad (1)$$

$$TL/2Y < 0.8 \quad (2)$$

where,

θ9 denotes the maximum value (unit: degree) of an angle between a plane-normal over an entire area in an effective plane of the image-side surface of the fourth lens, TL denotes a distance from a surface vertex of the first lens up to an image plane, and Y denotes the maximum image height.

2. The image forming optical system according to claim 1, wherein the aperture stop is disposed at an image side of the surface vertex of the first lens.

3. The image forming optical system according to claim 1, wherein the fourth lens satisfies the following conditional expression (3)

$$0 < (r8+r9)/(r8-r9) < 1.7 \quad (3)$$

where, r8 denotes a paraxial radius of curvature on the object side of the fourth lens, and r9 denotes a paraxial radius of curvature on an image side of the fourth lens.

4. The image forming optical system according to claim 1, wherein the fourth lens satisfies the following conditional expression (4)

$$0.35 < D8sd/D8\max < 0.7 \quad (4)$$

where,

D8sd denotes a distance between a virtual plane perpendicular to an optical axis, which passes through an effective diameter of an object-surface of the fourth lens and a virtual plane perpendicular to the optical axis, which passes through an effective diameter of the image-side surface of the fourth lens, and D8max denotes the maximum value of a thickness along the optical axial direction of the fourth lens.

5. The image forming optical system according to claim 1, wherein the third lens and the fourth lens satisfy the following conditional expression (5)

$$0.5 < \phi s7/\phi s8 < 0.7 \quad (5)$$

where,

φs7 denotes an effective diameter on the image side of the third lens, and

φs8 denotes an effective diameter on the object side of the fourth lens.

6. The image forming optical system according to claim 1, wherein the first lens, the second lens, the third lens, and the fourth lens are made of a resin.

7. An image pickup apparatus comprising an image forming optical system according to claim 1 and an auto-focusing mechanism that are integrated.

8. An image pickup apparatus comprising an image forming optical system according to claim 1 and an image pickup element that are integrated.

9. An information processing apparatus comprising:

an input section used to operate the information processing apparatus;

a processing section that processes at least information from the input section;

an image pickup apparatus that obtains image information based on information from the processing section;

an image processing section that processes the image information obtained by the image pickup apparatus; and a display section that displays the processed image, wherein the image pickup apparatus is the image pickup apparatus according to claim 8.

10. The information processing apparatus according to claim 9, further comprising:

a communication section, wherein the information processing apparatus can transmit the image information obtained by the image pickup apparatus.

11. The information processing apparatus according to claim 10, further comprising:

a sound obtaining section; and an information recording section.

12. The information processing apparatus according to claim 9, wherein the information processing apparatus is a portable electronic equipment.

* * * * *

UNITED STATES PATENT AND TRADEMARK OFFICE
CERTIFICATE OF CORRECTION

PATENT NO.        : 8,704,936 B2  
APPLICATION NO.   : 13/647022  
DATED             : April 22, 2014  
INVENTOR(S)       : Kenichiro Abe Page 1 of 1

It is certified that error appears in the above-identified patent and that said Letters Patent is hereby corrected as shown below:

In the Specification
at column 1, line 21, change "equipment's" to "equipment";
at column 1, line 21, change "such a" to "such as a";
at column 1, line 39, change "Optical" to "An optical";
at column 9, line 10, change "/" to "]";
at column 9, line 11, after "$A_{12}y^{12}$", add "..."; and
at column 9, line 12, change "e indicates '$10^{-n}$'" to "e-n indicates '$\times 10^{-n}$'".

Signed and Sealed this
Sixteenth Day of September, 2014

Michelle K. Lee
*Deputy Director of the United States Patent and Trademark Office*